United States Patent [19]

Nishino et al.

[11] Patent Number: 5,375,121
[45] Date of Patent: Dec. 20, 1994

[54] ATM CELL ASSEMBLING AND DISASSEMBLING SYSTEM AND METHOD

[75] Inventors: Tetsuo Nishino; Susumu Eda; Ryuji Hyodo; Katsumi Oomuro; Osamu Sekihata; Kenji Tanaka; Hiroyuki Hatta; Reiko Norizuki; Nakaba Yuhara, all of Kawasaki, Japan

[73] Assignee: Fujitsu Limited, Kawasaki, Japan

[21] Appl. No.: 227,471

[22] Filed: Apr. 14, 1994

Related U.S. Application Data

[63] Continuation of Ser. No. 935,113, Aug. 26, 1992, abandoned.

[30] Foreign Application Priority Data

Aug. 28, 1991 [JP] Japan .................... 3-215657

[51] Int. Cl.$^5$ .......................... H04J 3/26; H04L 12/56
[52] U.S. Cl. ........................ 370/94.2; 370/110.1
[58] Field of Search .............. 370/60, 60.1, 94.1, 370/94.2, 17, 110.1, 79

[56] References Cited

U.S. PATENT DOCUMENTS

| | | | |
|---|---|---|---|
| 5,056,088 | 10/1991 | Rice et al. | 370/94.1 |
| 5,097,466 | 3/1992 | Kammerl | 370/94.1 |
| 5,214,642 | 5/1993 | Kunimoto et al. | 370/94.1 |

FOREIGN PATENT DOCUMENTS 3-179851  8/1991  Japan .

Primary Examiner—Wellington Chin
Attorney, Agent, or Firm—Staas & Halsey

[57] ABSTRACT

In an ATM cell assembling and disassembling method for a communications network having first and second communications nodes, HDLC data is transferred from a first terminal to the first communications node via a first transmission line, the HDLC data conforming to an HDLC format. It starts to assemble, in the first communications node, at least one cell from the HDLC data when data which is contained in the HDLC data and equal to one cell has been received. Then the above at least one cell of ATM data is transferred from the first communications node to the second communications node. Disassembly is started, in the second communications node, of the above at least one cell of ATM data to thereby generate original HDLC data when a fluctuation compensation time has elapsed after a first cell of ATM data among the above-mentioned at least one cell of ATM data is received by the second communications node. The fluctuation compensation time is based on a maximum fluctuation time of a route connecting the first and second communications nodes to each other as well as a bit rate of the first transmission line. Finally, the original HDLC data is transferred to a second terminal from the second communications node via a second transmission line.

30 Claims, 22 Drawing Sheets

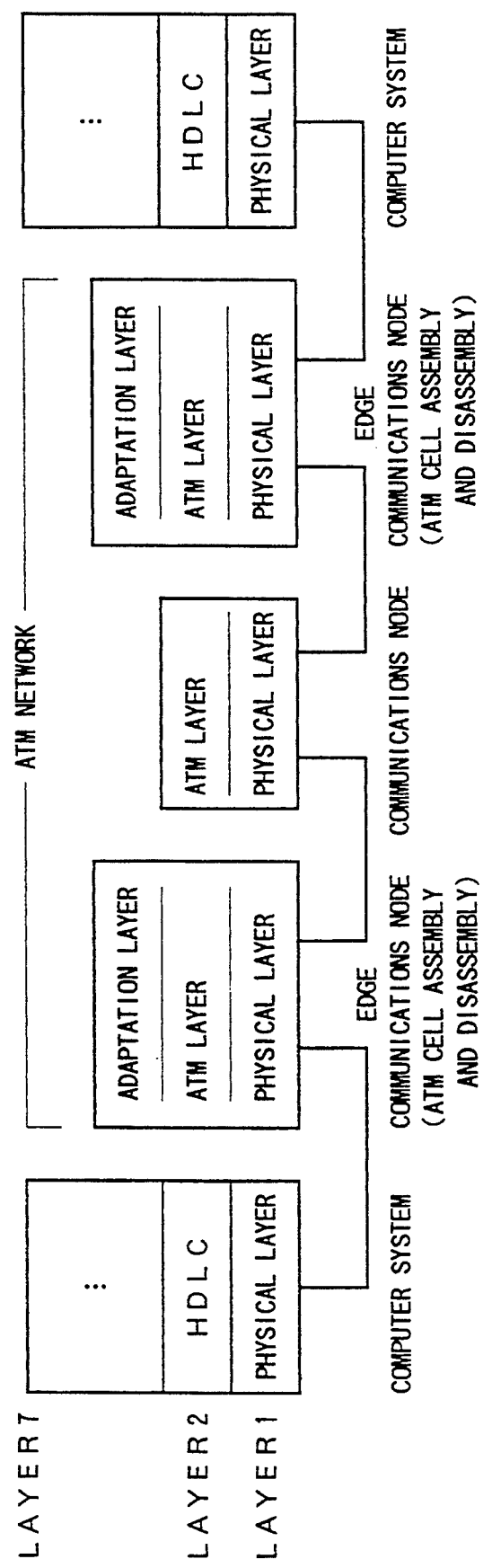

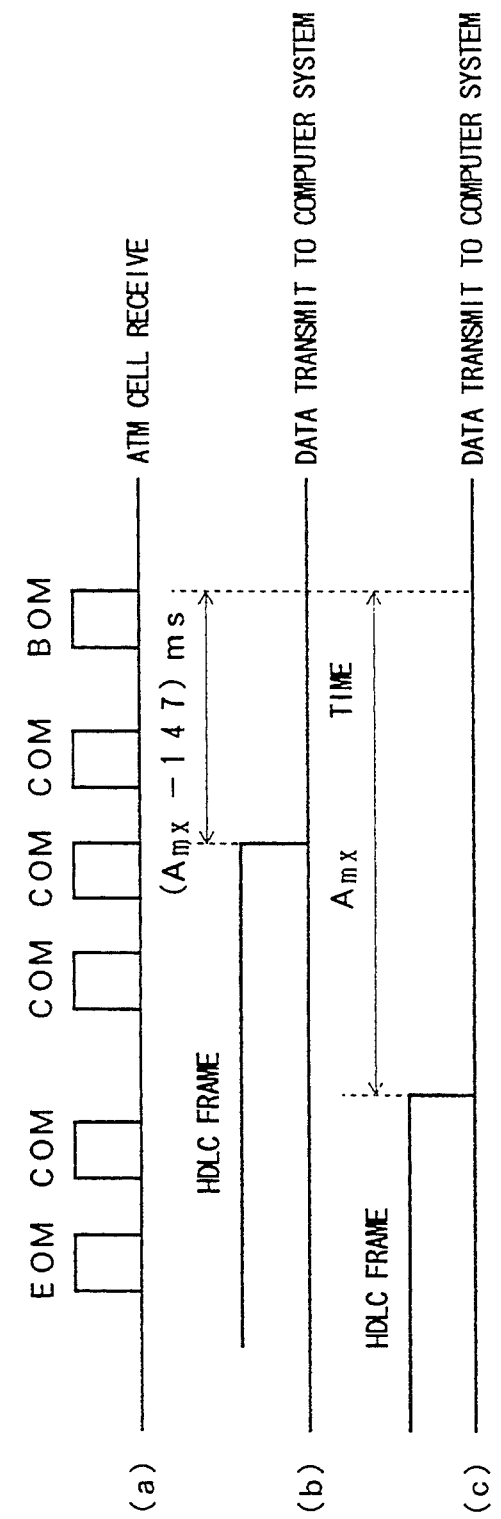

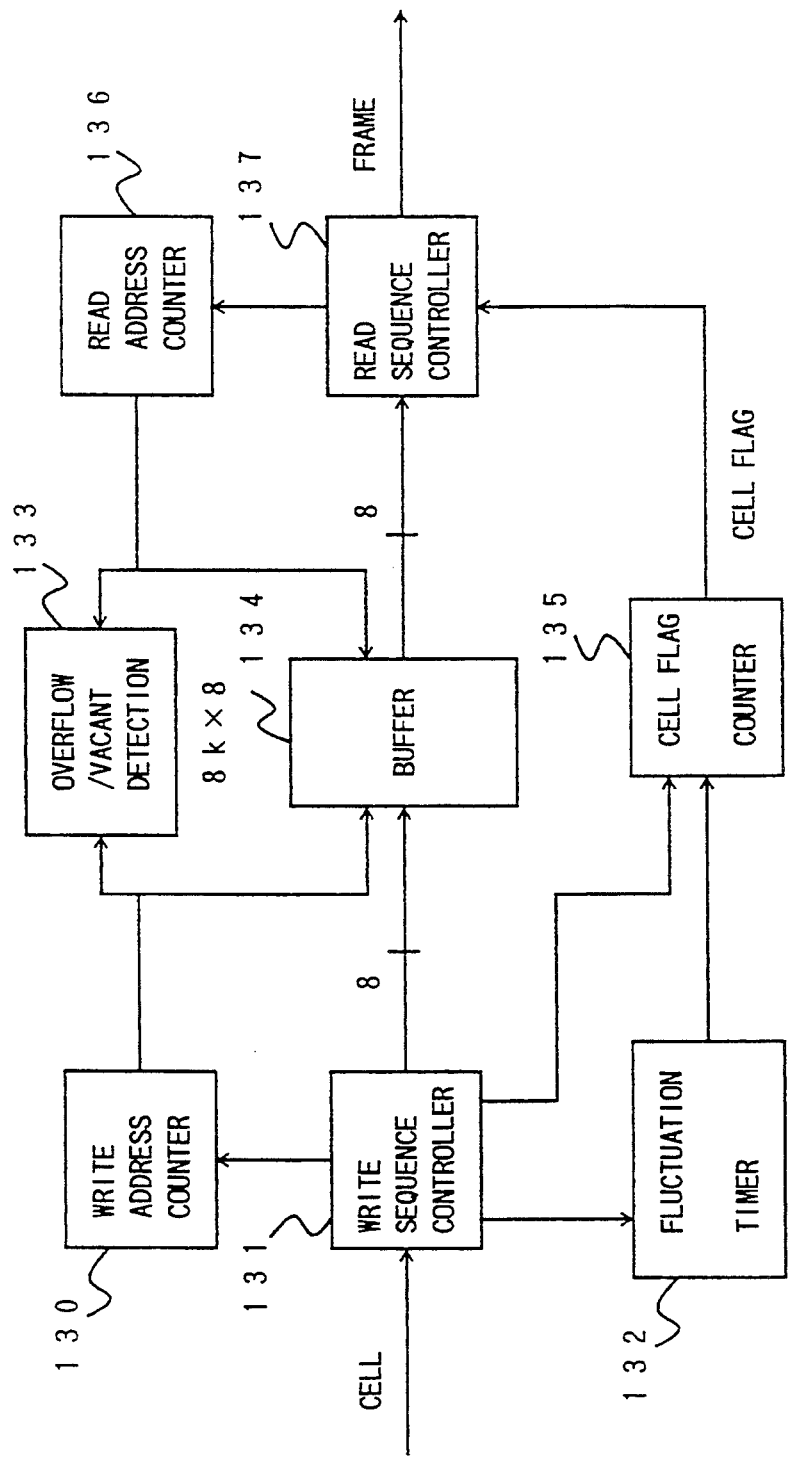
F I G. 11

ATM CELL ASSEMBLING AND DISASSEMBLING SYSTEM AND METHOD

This application is a continuation of U.S. patent application Ser. No. 07/935,113, filed Aug. 26, 1992, now abandoned.

BACKGROUND OF THE INVENTION

1. Field of the Invention

The present invention generally relates to an ATM (Asynchronous Transfer Mode) communications system, and more particularly to an ATM communications system in which data conforming to an HDLC (High-Level Data Link Control) procedure is transferred in the form of ATM cells.

2. Description of the Prior Art

Generally, computer systems, such as host computers, workstations, and personal computers, use communications protocols with layer structures. The OSI has proposed a layer structure consisting of seven layers. The second layer or layer 2 is a data link layer, and HDLC procedures are main procedures for the data link layer. Examples of the HDLC procedures are LAPB, LAPD SNA (IBM), and FNA (Fujitsu).

Computer systems are coupled to each other in broadband communications by means of a line switching network, a packet switching network or a dedicated line network. Recently, there has been considerable activity in the development of ATM networks capable of handling multiple media, such as speech, computer data and image data. It is expected that the existing terminals will continue to be used for a while after the ATM networks enter into practical use. Under this circumstance, in order to reduce delay in an end-to-end transfer, it is necessary to use an efficient conversion procedure (an assembling and disassembling procedure) for converting HDLC frames and ATM cells into each other.

FIG. 1A shows an OSI (Opened Systems Interconnection) standard model, in which protocols are respectively defined for layers 1 to 7. FIG. 1B shows a layer structure of a communications system which is a line switching network or a dedicated line network in the data transfer mode. Communications nodes provided between computer systems (terminals) are TDM (Time Division Multiplexing) equipment or PBXs (Private Branch exchanges). The computer systems or terminals in the communications system shown in FIG. 1B execute processes for layers 1 to 7, and the communications node execute processes for layer 1.

FIG. 1C shows a frame format conforming to HDLC which is a typical data link protocol for layer 2 (data link layer) in the OSI standard model. As shown, the frame comprises two flag fields F, an address field A, a control field C, an information field I, and a frame check sequence (FCS) field.

FIGS. 2A, 2B and 2C show HDLC data communications using an ATM. More particularly, FIG. 2A shows an ATM communications protocol. The ATM communications protocol comprises a physical layer, an ATM layer, an adaptation layer and high-order layers. The physical layer and the ATM layer correspond to layer 1, and the adaptation layer relates to layers 1 and 2. FIG. 2B shows an ATM cell format, which has a fixed length of 53 bytes (one byte is equal to 8 bits). The first five bytes form an ATM header, sixth and seventh bytes form an adaptation header, eighth to 51st bytes form an information field, and 52nd and 53rd octets form an adaptation trailer. The ATM header contains controlling information, such as routing information concerning the ATM cell. The adaptation header and the adaptation trailer contain control information concerning cell transfer and disassembly of cells at a terminal or computer system with which communicates.

FIG. 2C shows communications of HDLC data in an ATM network. The computer systems handle the physical layer, the HDLC layer (data link layer), and layers higher than the HDLC layer. Each of the communications nodes handles the physical layer and the ATM layer. Particularly, edge communications nodes (a calling communications node and a called communications node) further handle the adaptation layer (ATM cell assembly and disassembly) in addition to the physical layer and the ATM layer.

FIG. 3A shows a conventional ATM cell assembling and disassembling procedure in the ATM network. FIG. 3A shows an ATM cell assembling and disassembling process executed in communications nodes in which HDLC data is processed. That is, the flags in the frame of the HDLC data sent by a computer system are deleted therefrom at a communications node. The remaining data contained in the fields A, C, I and FCS are divided into pieces every 44 bytes. An ATM cell shown in FIG. 2 is assembled for each 44-byte data segment. That is, each ATM cell comprises the ATM header, the adaptation header, the 44-byte data and the adaptation trailer. When the original data except for the flags has a length larger than a plurality of cells, each ATM cell assembled comprises, as adaptation information, information showing the position of the ATM cell of interest. In other words, the above information shows in which one of a BOM (Beginning-Of-Message) cell, a COM (Continuation-Of-Message) cell and an EOM (End-Of-Message) cell the ATM cell having the above information is. When the original data length except for the flags is located equal to or less than a data length accommodated in one ATM cell (44 bytes), the adaptation information contained in a single ATM cell shows an SSM (Single-Segment-of-Message) cell.

A process for assembling ATM cells from HDLC frames and disassembling ATM cells into HDLC frames has not been practically used. However, one may consider an application of the existing communications techniques, as shown in FIG. 3B. A communications system shown in FIG. 3B comprises a computer system on a transmission side 70, a communication node 71 on the transmission side, a communication node 72 on a reception side, and a computer system 73 on the reception side.

A cell assembling unit 711 of the communications node on the transmission side converts HDLC frames into ATM cells, each of which cells has a fixed data length. After receiving one frame from the computer system 70, the cell assembling unit 711 starts to assemble ATM cells. A cell disassembling unit 721 of the communications node 72 on the reception side disassembles the ATM cells into HDLC frames, and starts, after receiving ATM cells corresponding to one frame, to disassemble these ATM cells.

It will now be assumed that the computer system 70 sends an HDLC frame of 256 bytes to a transmission line at a bit rate of 2.4 kbps. A frame receiver 710 of the communications node 71 receives all of the HDLC frame, and then instructs the cell assembling unit 711 to assemble ATM cells. Hence, the cell assembling process is started after 256×8/2.4 kbps (=853 ms). The ATM cells thus assembled are successively sent to a transmission line via a cell transmitter 712.

The ATM cells from the communications node 71 are transferred via, for example, other communications nodes in the ATM network, and are then received by a cell receiver 720 of the communications node 72 at the receiving side. Each time the ATM cells pass through a communications node in the ATM network, they are written into a buffer in the communications node and read therefrom. During this time, various calls are switched via each buffer, and thus the time necessary for the cells to pass through each node are not constant, and is dependent on the number of stages of ATM switches and the number of cells remaining in each buffer.

The interval between consecutive ATM cells in the same HDLC frame at the transmission side is different from those at the reception side. That is, the interval between the consecutive ATM cells fluctuates. In order to cope with fluctuations in the interval between the consecutive ATM cells, a maximum fluctuation time Amx (ms) is taken into account. That is, the ATM cell disassembling process is started when the maximum fluctuation time Amx has elapsed after the first ATM cell (BOM cell) is received. Data contained in the HDLC frame thus formed can be successively transferred to the computer system 73 via a frame transmitter 722.

However, the above-mentioned related art has the following disadvantages. It takes a long time to assemble ATM cells from the HDLC frame on the transmission side because the ATM cell assembling process is started after the HDLC frame has been completely received. Further, it takes a long time to disassemble ATM cells to generate the original HDLC frame because it is always necessary to start the ATM cell disassembling process when the maximum fluctuation time Amx has elapsed after the first ATM cell is received. As a result, there is a large delay in the end-to-end transfer. This increases the time it takes to execute applications (processes in the upper layers) between the computer systems.

SUMMARY OF THE INVENTION

It is a general object of the present invention to provide an ATM cell assembling and disassembling system and method in which the above mentioned disadvantages are eliminated.

A more specific object of the present invention is to provide an ATM cell assembling and disassembling system and method capable of assembling and disassembling ATM cells at higher speed and executing end-to-end communications with reduced transfer time.

The above objects of the present invention are achieved by an ATM cell assembling and disassembling method for a communications network having first and second communications nodes. The method comprises the steps of:

(a) transferring HDLC data from a first terminal to the first communications node via a first transmission line, the HDLC data conforming to an HDLC format;

(b) starting to assemble, in the first communications node, at least one cell from the HDLC data when data which is contained in the HDLC data and equal to one cell has been received;

(c) successively transferring the above at least one cell from the first communications node to the second communications node: and (d) starting to disassemble, in the second communications node, the above at least one cell to thereby generate original HDLC data when a fluctuation compensation time has elapsed after a first cell among the above at least one cell is received by the second communications node, the fluctuation compensation time being based on a maximum fluctuation time of a route connecting the first and second communications nodes to each other as well as a bit rate of the first transmission line; and (e) transferring the original HDLC data to a second terminal from the second communications node via a second transmission line.

The above objects of the present invention are also achieved by an ATM cell assembling and disassembling system comprising a first communications node;

a second communications node: and a network coupling the first and second communications nodes to each other.

The first communications node comprises first means for assembling at least one cell from HDLC data transferred from a first terminal via a first transmission line, the first means starting to assemble the above at least one cell when data which is contained in the HDLC data and equal to one cell has been received, the HDLC data conforming to an HDLC format; and second means for successively transferring the above at least one cell from the first communications node to the network.

The second communications node comprises:

third means for disassembling the above at least one cell to thereby generate original HDLC data, the second means starting to disassemble the above-mentioned at least one cell when a fluctuation compensation time has elapsed after a first cell among the above at least one cell is received by the second means, the fluctuation compensation time being based on a maximum fluctuation time of a route connecting the first and second communications nodes to each other as well as a bit rate of the first transmission line; and fourth means for transferring the original HDLC data to a second terminal from the second communications node via a second transmission line.

BRIEF DESCRIPTION OF THE DRAWINGS

Other objects, features and advantages of the present invention will become more apparent from the following detailed description when read in conjunction with the accompanying drawings, in which:

FIGS. 2A, 2B and 2C are diagrams showing a possible HDLC data communications via an ATM network;

FIGS. 6A and 6B are diagrams illustrating an operation of the ATM communications network when a plurality of cells are generated from an HDLC frame;

FIG. 11 is a block diagram of a ATM cell disassembling unit shown in FIG. 4;

DESCRIPTION OF THE PREFERRED EMBODIMENTS

Figure 4:
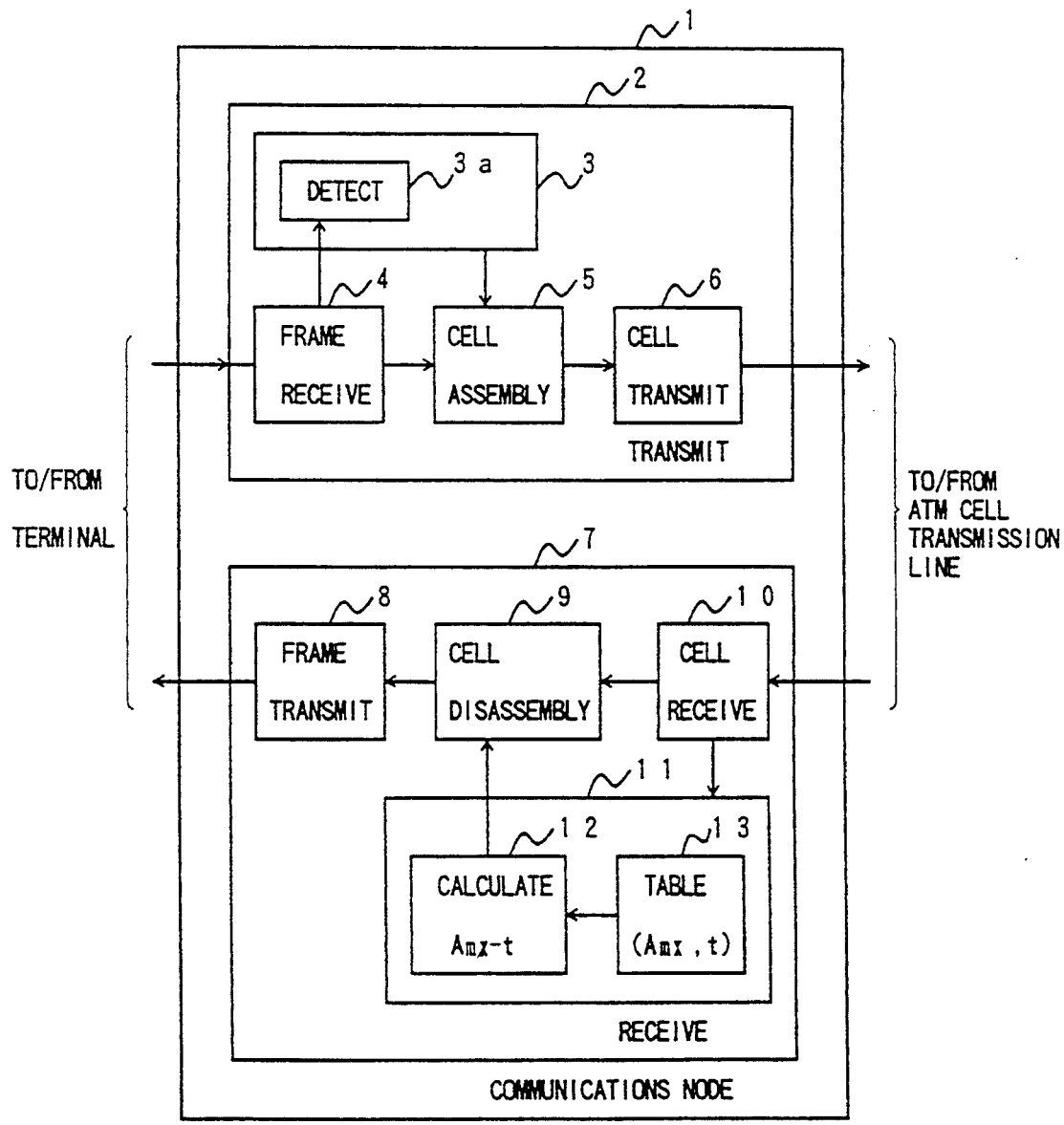
FIG. 4 is a block diagram showing an overview of a communications node according to the present invention.

FIG. 4 shows an overview of the present invention. A communications node 1 shown in FIG. 4 comprises a transmission unit 2 and a reception unit 7. The transmission unit 2 comprises a cell assembling controller 3, a frame receiving buffer unit 4, a cell assembling buffer unit 5, and a cell transmitting buffer unit 6. The cell assembling controller comprises a one-cell-length detection unit 3a. The reception unit 7 comprises a frame transmitting buffer unit 8, a cell disassembling buffer unit 9, a cell receiving buffer unit 10, and a cell disassembling controller 11. The cell disassembling controller 11 comprises a fluctuation compensation calculation unit 12 and a table 13.

A terminal (not shown in FIG. 4) transmits an HDLC frame to the communications node 1 of an ATM communications system to the frame receiving buffer unit 4 of the transmission unit 2. The one-cell-length detection unit 3a detects that data (from which flags have been eliminated) corresponding to one cell length is stored in the frame receiving buffer unit 4. Then, the one-cell-length detection unit 3a instructs the cell assembling buffer unit 5 to assemble an ATM cell. The ATM cell assembled in the cell assembling buffer 5 is transferred to a transmission line connected to an ATM network via the cell transmitting buffer unit 6. It will be noted that according to the present invention the ATM cell assembling process is started when data equal to one cell has been received, while according to the aforementioned related art the ATM cell assembling process is started when one HDLC frame has been received.

An ATM cell generated by another communications node (not shown) and transferred via the ATM network is received by the cell receiving buffer 10. When a path setup procedure (or a call setup procedure) is carried out for the reception unit 7 by the communications node at the transmission side, the cell disassembling controller 11 obtains a maximum fluctuation time Amx on the basis of predetermined information containing, for example, the number of stages in each ATM switch provided in a route between the communications node at the transmission side and the communications node at the reception side. The maximum fluctuation time thus obtained is stored in the table 13. Since the bit rate of the transmission line between the terminals at the transmission side and the reception side is known, it is possible to obtain the time t (one-cell transmission time) necessary to transfer one ATM cell via the transmission line. Data indicating the one-cell transmission time t is stored in the table 13.

When the cell receiving buffer 10 receives the BOM cell, the fluctuation compensation calculation unit 12 carries out an operation in which the one-cell-transmission time t is subtracted from the maximum fluctuation time Amx, the subtraction result (Amx−t) being a fluctuation compensation time. The fluctuation compensation calculation unit 12 causes the cell disassembling buffer 9 to start the cell disassembling process when the fluctuation compensation time (Amx−t) has elapsed after the BOM cell is received. Thereby, the EOM cell is received within the maximum fluctuation time Amx, and is disassembled. Data contained in the EOM cell is transferred, in the HDLC format, to the terminal.

When the SSM cell containing all data in one HDLC frame is received, the reception unit 7 immediately starts the ATM cell disassembling process and data transfer to the called terminal.

Figure 5:
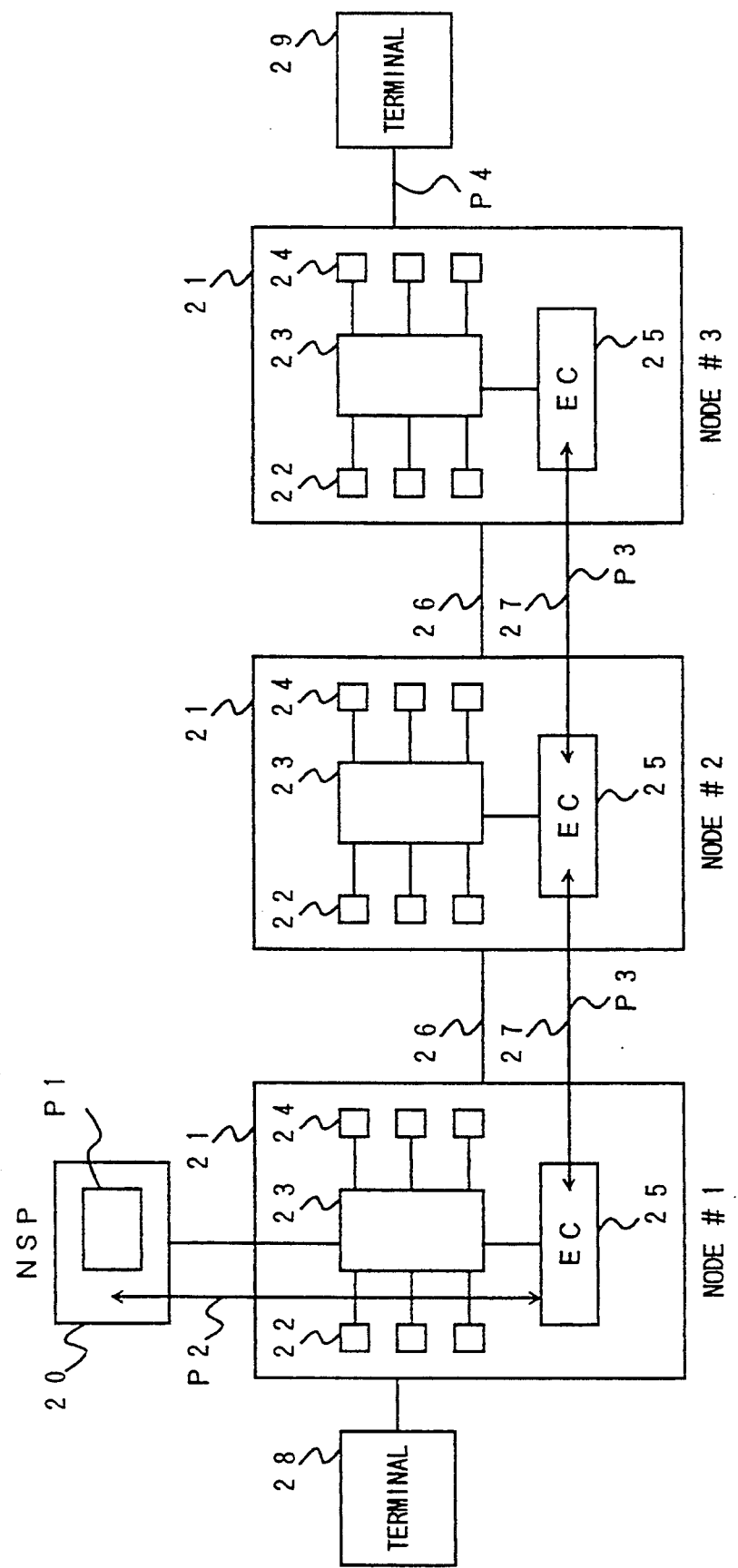
FIG. 5 is a block diagram of an ATM communications network according to an embodiment of the present invention.

FIG. 5 is a block diagram of an ATM network according to an embodiment of the present invention. The ATM network shown in FIG. 5 comprises a network service processor (NSP) 20, three communications nodes (#1, #2, #3) 21, and a plurality of terminals including two terminals 28 and 29. The network service processor 20 controls and manages the ATM network. The communications node #1 accommodates the terminal 28. The communications node #2 serves as a relay node. The communications node #3 accommodates the terminal 29. Each of the communications nodes #1, #2 and #3 comprises input units 22, a switching unit 23, output units 24, and an equipment controller (EC) 25. The input units 22 receive HDLC frames from terminals and ATM cells from other communications nodes. The output units 24 send HDLC frames to terminals and send ATM cells to other communications nodes. The adjacent communications nodes are coupled to each other via an ATM cell transmission line 26 and a control signal line 27. These lines 26 and 27 are multiplexed on an identical physical line. Although not shown for the sake of convenience, the input units 22 respectively have ATM cell assembling units, and the output units 24 respectively have ATM cell disassembling units.

It will now be assumed that the terminal 28 is at the transmission side and the terminal 29 is at the reception side. As indicated by P1 shown in FIG. 5, the network service processor 20 of the communications node #1 has command information concerning the communications nodes #1, #2 and #3 including fluctuation times therein. As indicated by P1 and P2, the command information is transferred, via the control signal lines 27, to the equipment controllers 25 of the communications nodes #1, #2 and #3 and held therein when the ATM communications system is set up. Data indicating the bit rates of the lines connected to the terminals are stored beforehand in the equipment controllers 25 of the communications nodes #1–#3 to which the terminals are connected. In order to obtain the fluctuation compensation time (Amx−t) of a line between the calling terminal and the called terminal, it is also possible to transfer management cells via ATM cell transmission lines 26 in a manner which will be described in detail later.

When the terminal 28 connected to the communications node #1 has a request to transfer HDLC data to the terminal 29, the equipment controller 25 of the communications node #3 obtains the maximum fluctuation time Amx related to a route including the communications nodes #1–#3, and a one-celltransmission time of the above route. In the output unit 24 to which the terminal 29 is connected, the fluctuation compensation time (Amx−t) is calculated in the aforementioned manner.

Thereafter, the communications node #1 receives HDLC data from the terminal 28 at the transmission side. The input unit 22, to which the terminal 28 is connected, eliminates flags from the HDLC frame. When the input unit 22 completely receives data equal to one cell length, it starts the cell assembling and transmitting process. The ATM cells are transferred via the input unit 22, the switching unit 23 and the output unit 24, and are received by the output unit 24. The output unit 24 measures the elapse of the fluctuation compensation time (Amx−t) after detecting the BOM cell. When it is determined that the fluctuation compensation time (Amx−t) has elapsed, the output unit 24 starts the ATM cell disassembling process. An HDLC frame thus formed is output to the terminal 29 at the reception side.

Figure 6A:
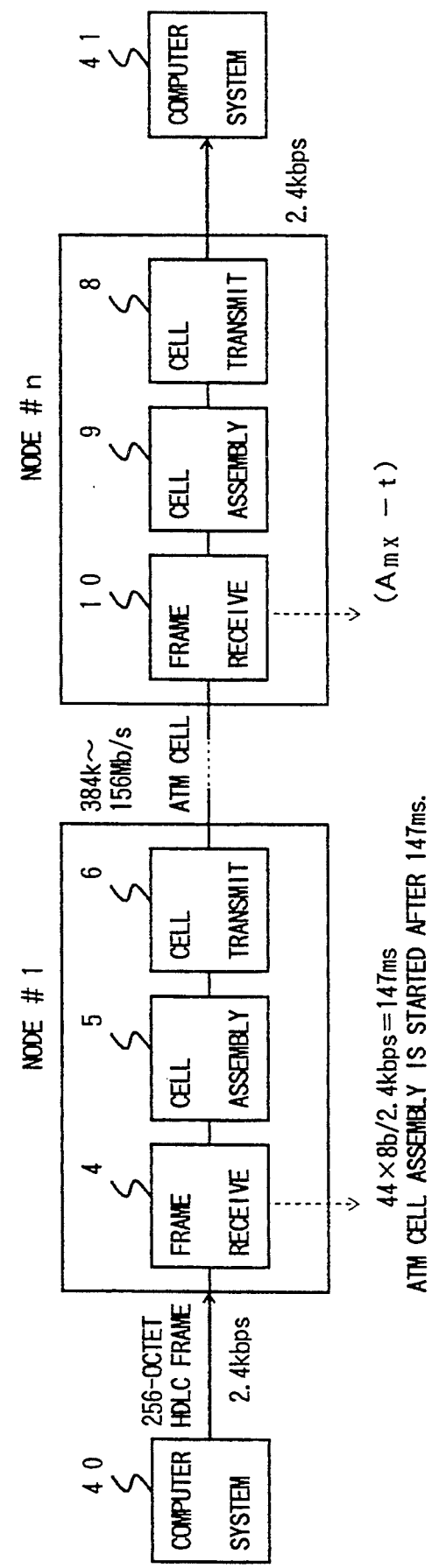

A description will now be given, with reference to FIGS. 6A and 6B, of a transfer operation in which one HDLC frame is formed by a plurality of ATM cells. A communications network shown in FIG. 6A comprises computer systems 40 and 41, and a plurality of communications nodes (only two communications nodes #1 and #n are illustrated in FIG. 6A). The following description relates to an operation in which the computer system 40 transmits an HDLC frame corresponding to a plurality of ATM cells to the computer system 41 via the communications nodes #1 and #n. If a transmission line between the computer system 40 and the communications node #1 has a bit rate of 2.4 kbps, and the computer system 40 transmits an HDLC frame consisting of 256 bytes, the time it takes the frame receiving buffer unit 4 of the communications node #1 to receive data equal to one cell (44 bytes) is $[44 \times 8(\text{bits})]/(2.4 \times 1000) = 147$ (ms). Hence, the ATM cell assembling process executed by means of the cell assembling buffer 5 is started when 147 ms has elapsed when the data is first received. Then, the assembled ATM cell is transferred to the communications node #n.

During a pass setup process before the first ATM cell is transmitted, the maximum fluctuation time data Amx (ms) and the data indicating the one-cell-transmission time (=147 ms) based on the bit rate (2.4 kbps) of the transmission line between the computer system 40 and the communications node #1, are set in the communications node #n. In the communications node #n, the ATM cell disassembling process is started when the time Amx (ms)−147(ms) has elapsed after the BOM cell is received. In this manner, ATM cells are successively generated and transferred.

Figure 3A:
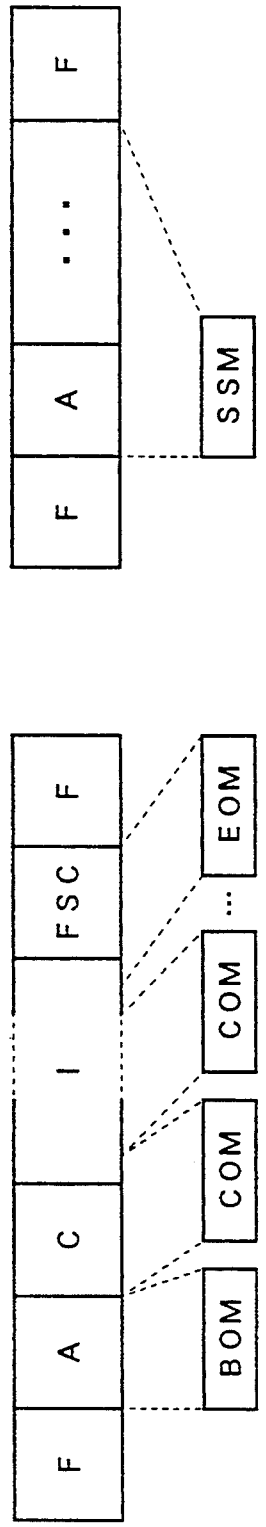
FIGS. 3A and 3B are diagrams of a possible ATM assembling and disassembling process in an ATM network.
Figure 3B:
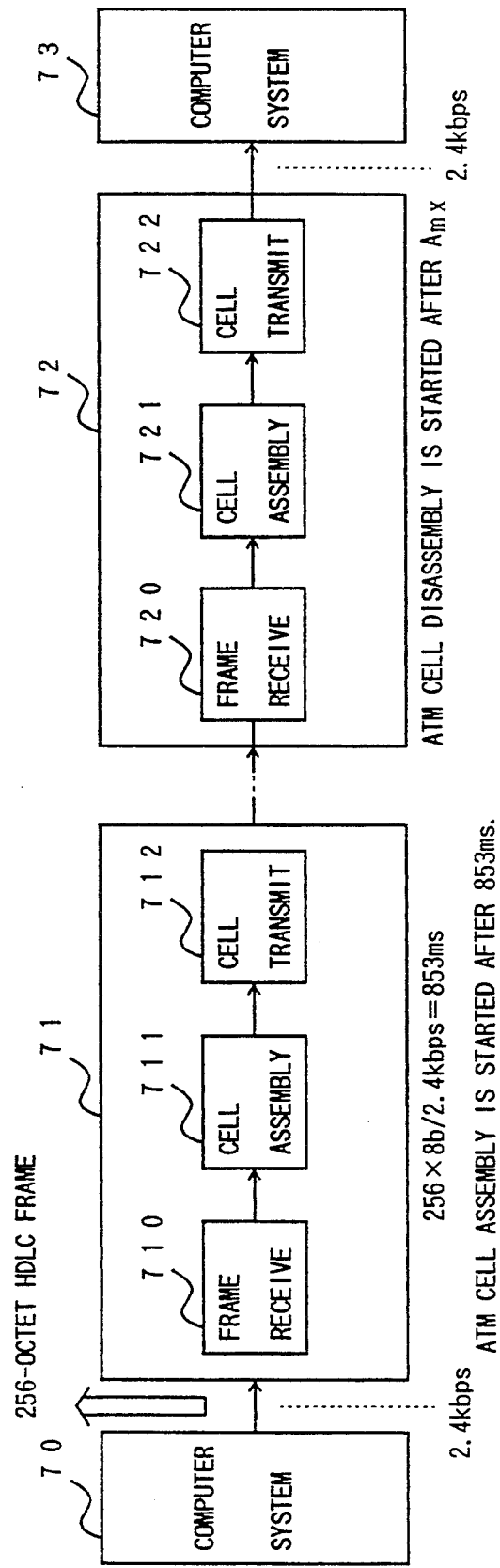

FIG. 6B is a timing chart of the operation mentioned above with reference to FIG. 6A. FIG. 6B-(a) shows ATM cells received by the communications node #n. FIG. 6B-(b) shows an HDLC frame generated from the ATM cells shown in FIG. 6B-(a). The transmission of the HDLC frame is started when (Amx−147) ms has elapsed after the BOM message is received. FIG. 6B-(c) is a timing chart of the related art mentioned with reference to FIG. 3B. The transmission of the HDLC frame is started when Amx has elapsed after the BOM message is received.

Figure 7A:
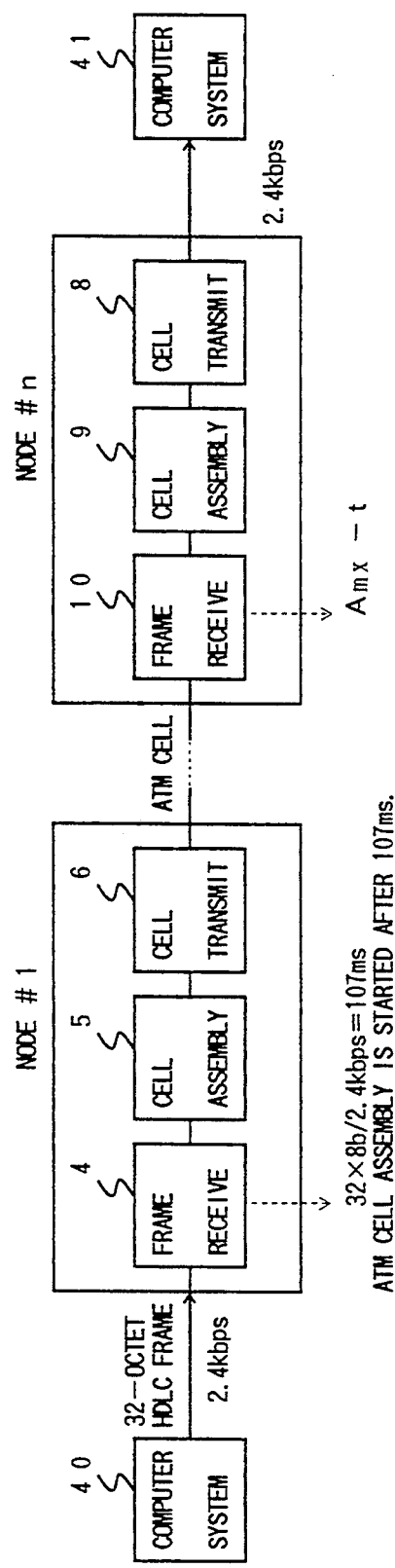
FIGS. 7A and 7B are diagrams illustrating an operation of the ATM communications network when a single cell is generated from an HDLC frame.
Figure 7B:
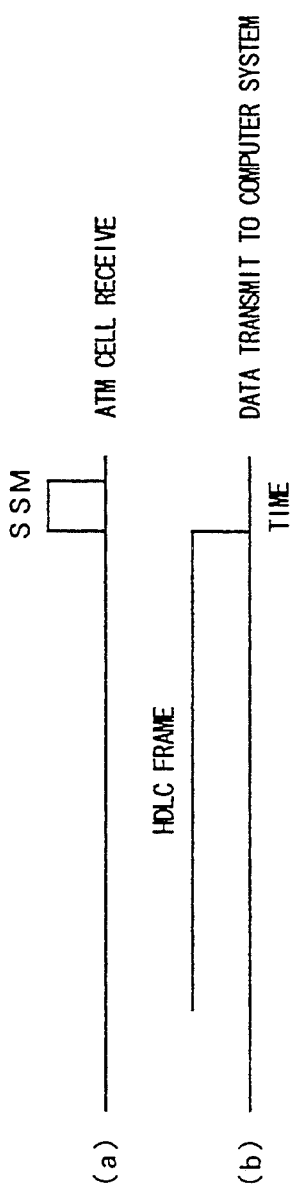

FIG. 7A shows a communications network in which a single ATM cell corresponding to one HDLC frame is transferred. The communications network itself shown in FIG. 7A is the same as that shown in FIG. 6A. The computer system 40 sends a 32-byte HDLC frame to the communications node #1. The communications node #1 starts to assemble a single ATM cell when a time of 107 ms has elapsed when receiving the 32-byte HDLC frame. The ATM cell is then transferred to the communications node #n, which can understand that the received ATM cell is an SSM cell by referring to information concerning the adaptation layer. Hence, immediately after the ATM cell is received, an HDLC frame is transmitted to the computer system 41.

A description will now be given of the details of the communications node 1 shown in FIG. 4.

Figure 8:
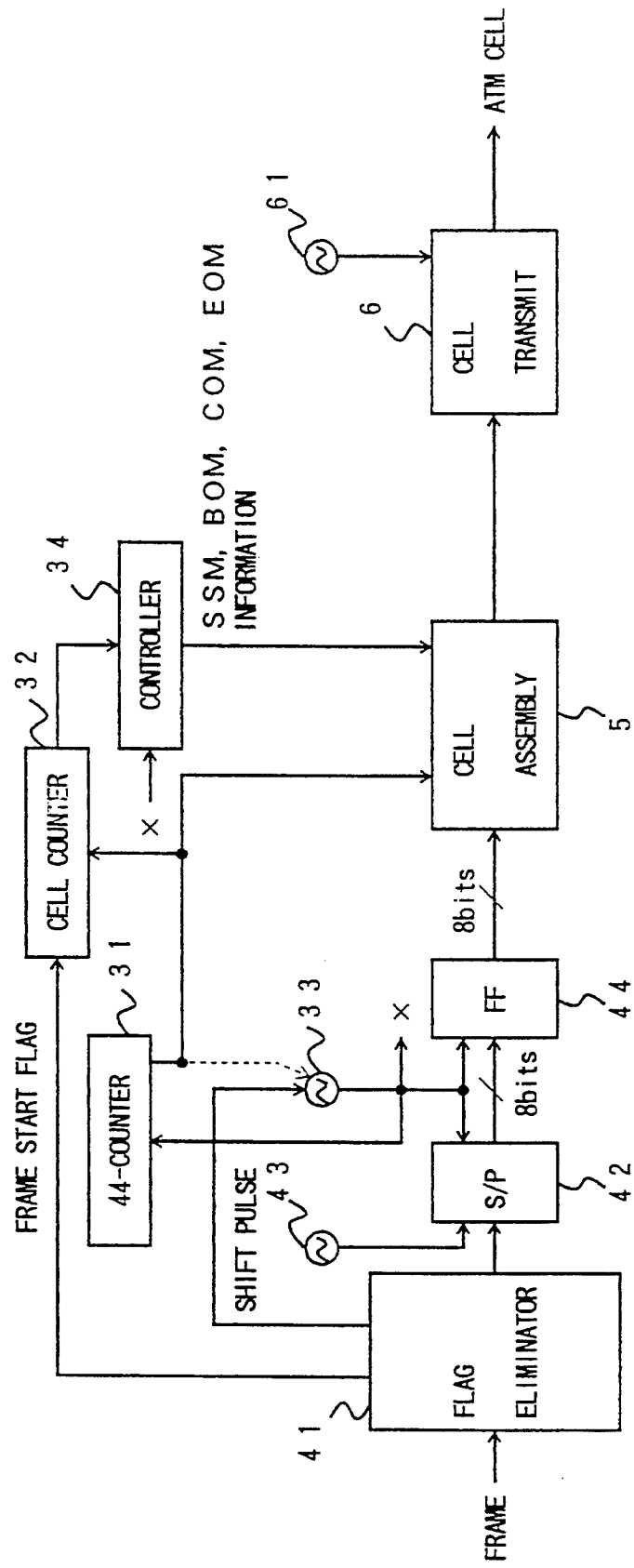
FIG. 8 is a block diagram of a transmission unit shown in FIG. 4.

FIG. 8 shows the structure of the transmission unit 2 shown in FIG. 4. In FIG. 8, parts that are the same as parts shown in FIG. 4 are given the same reference numerals as previously. The cell assembling controller 3 comprises a 44-counter 31, a cell counter 32, a flip-flop write pulse generator 33, and a controller 34. The frame receiving buffer unit 4 comprises a flag eliminator 41, a serial-to-parallel (S/P) converter 42, a shift pulse generator 43 and a flip-flop 44. A transmission line synchronizing clock generator 61 is connected to the cell transmission buffer unit 6.

Figure 1A:
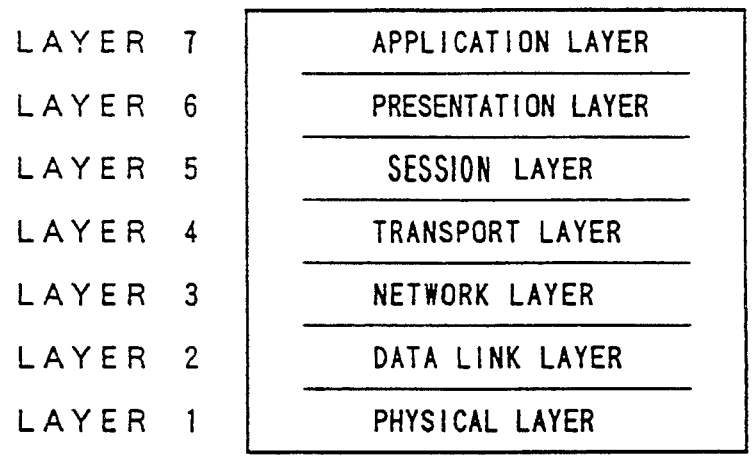
FIGS. 1A, 1B and 1C are diagrams showing a conventional communications protocol.
Figure 1B:
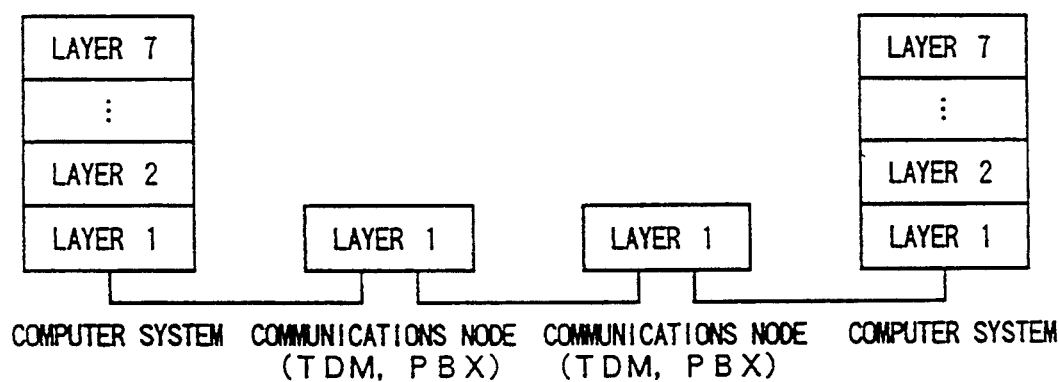
Figure 1C:
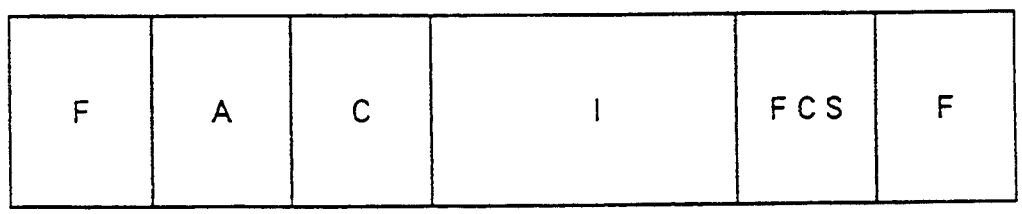
Figure 2A:
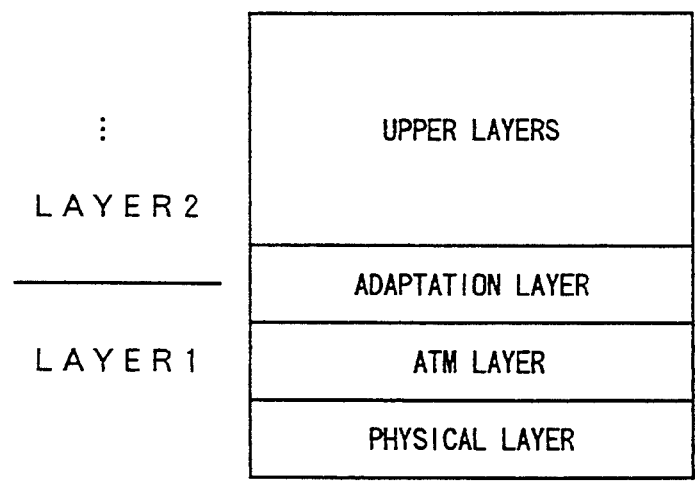
Figure 2B:
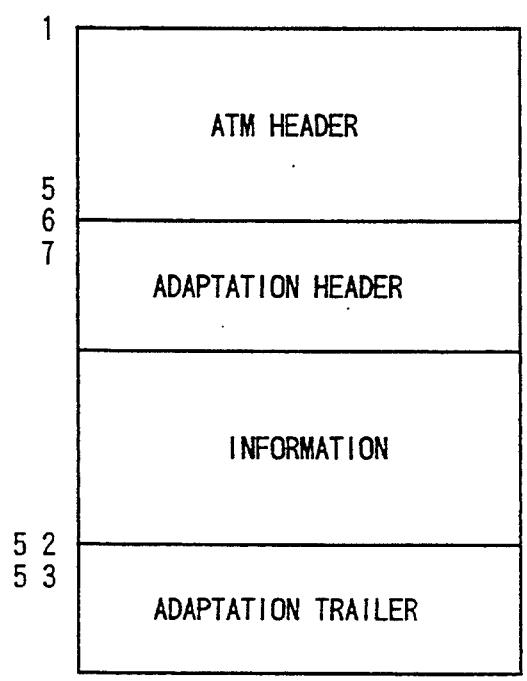
Figure 9:
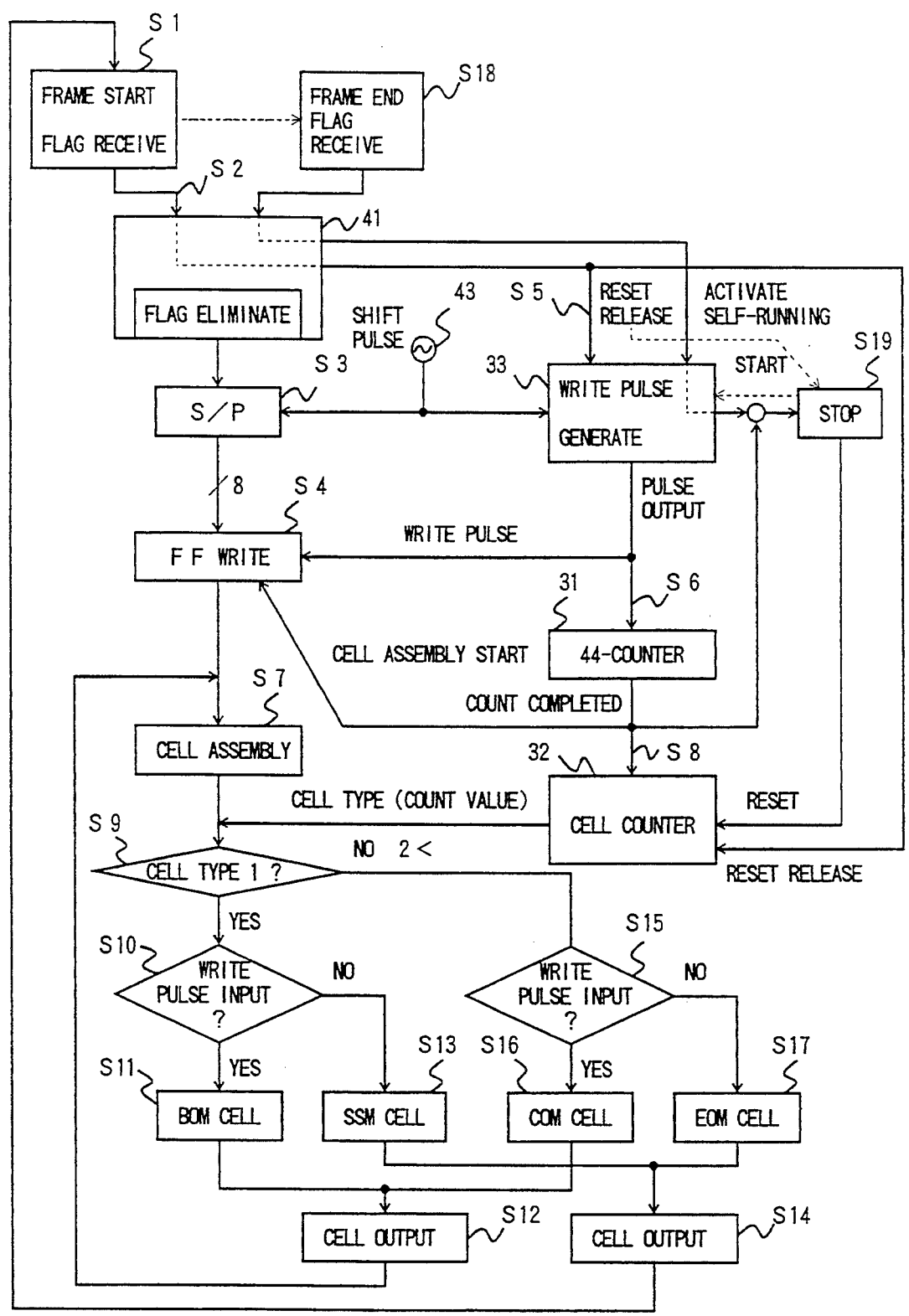
FIG. 9 is a flowchart showing the operation of the transmission unit shown in FIG. 8.

FIG. 9 shows a sequence of the operation of the transmission unit 2 shown in FIG. 8. An HDLC frame from a terminal is transferred with a bit rate of, for example, 2.4 kbps, and is applied to the flag eliminator 41. In step S1, the flag eliminator 41 receives the flag F located at the leading end of the HDLC frame shown in FIG. 1C. In step S2, the flag eliminator 41 eliminates the above flag from the HDLC frame. In step S3, subsequent data in the HDLC frame is converted into 8-bit parallel data by means of the S/P converter 42 in synchronism with a shift pulse generated by the shift pulse generator 43. The 8-bit parallel data from the S/P converter 42 is applied to the flip-flop 44.

In response to receipt of the flag F located at the leading end of the HDLC frame, the flip-flop write pulse generator 33 is released from the reset state, and starts, in step S5, to generate a write pulse each time 8 consecutive shift pulses generated by the shift pulse generator 43 are received. In response to receipt of the write pulse, in step S4 the 8-bit parallel data from the S/P converter 42 is written into the flip-flop 44, and 8-bit parallel data stored in the flip-flop 44 is written into the cell assembling buffer unit 5. The write pulse generated by the generator 33 is also applied to the 44-counter 31, which increments its count value by 1 each time the write pulse is received in step S6.

Figure 10:
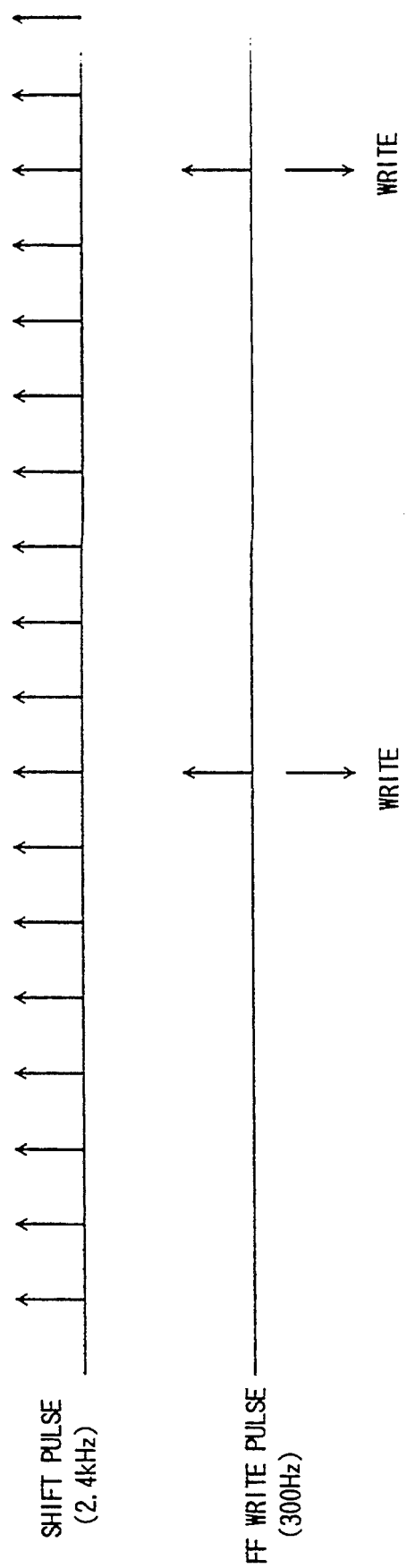
FIG. 10 is a timing chart showing the operation of the transmission unit shown in FIG. 8.

FIG. 10 shows a series of shift pulses generated by the shift pulse generator 43, and flip-flop write pulses generated by the generator 33. The shift pulse train has a frequency of 2.4 kHz, and the write pulse train has a frequency of 300 Hz.

When the count value of the 44-counter 31 becomes equal to 44, the 44-counter 31 outputs an instruction signal to the cell assembling buffer 5, so that the cell assembling operation is carried out in the cell assembling buffer 5 in step S7. It will be noted that the 44-counter functions to detect one cell length. The instruction signal generated by the 44-counter is also applied to the cell counter 32, and its count value is incremented by, for example, 1 in step S8. The cell counter 32 is released from the reset state in response to receipt of the flag F detected in step S2. The controller 34 determines, in step S9, whether or not the count value of the cell counter 32 is equal to 1. The count value of the cell counter 32 indicates the type of the ATM cell assembled in step S7. When it is determined that the count value of the cell counter 32 is equal to 1, the controller 34 determines, in step S10, whether or not the write pulse is generated by the generator 33.

When the determination result is YES, the controller S10 understands, in step S11, that the ATM cell assembled in step S7 is a BOM cell. Then, the controller 34 outputs BOM information to the cell assembling buffer unit 5, which outputs the ATM cell with the BOM information added thereto to the cell transmission buffer unit 6 in step S12. Then, step S7 is executed. When it is determined, in step S10, that there is no write pulse from the generator 33, the controller 34 understands, in step S13, that the ATM cell assembled in step S7 is an SSM cell. Then, the controller 34 outputs SSM information to the cell assembling buffer unit 5, which outputs the ATM cell with the SSM information added thereto to the cell transmission buffer unit 6 in step S14.

When it is determined, in step S9, that the count value of the cell counter 32 is equal to or larger than 2, the controller 34 determines whether or not the write pulse is generated from the generator 33. When the determination result is YES, the controller 34 understands, in step S16, that the ATM cell assembled in step S7 is a COM cell. Then, the controller 34 outputs COM information to the cell assembling buffer unit 5, and step S12 is executed. When the result of the determination in step S15 is NO, the controller 34 understands, in step S17, that the ATM cell assembled in step S7 is an EOM cell. Then, the controller 34 outputs EOM information to the cell assembling buffer unit 5, and step S14 is executed. Then, step S1 is executed.

When the flag F located at the trailing end of the HDLC frame is detected in step S18, the write pulse generator 33 is controlled so that it continues to operate (free-running) until the count value of the 44-counter has become equal to 44. During this time, an empty pattern (consisting of only bits "1") is written into the flip-flop 44.

FIG. 11 shows the details of the cell disassembling unit 9, and the cell disassembling controller 11 shown in FIG. 4. The reception unit 7 is provided in each of the aforementioned output units 24. The reception unit 7 shown in FIG. 11 comprises a write address counter 130, a write sequence controller 131, a fluctuation timer 132, an overflow/vacant detection circuit 133, a buffer 134, a cell flag counter 135, a read address counter 136, and a read sequence controller 137. The write address counter 130 generates a write address of the buffer 134.

The write sequence controller 131 converts an ATM cell in serial form from the cell receiving buffer unit 10 into 8-bit parallel data. The ATM cells (pieces of 8-bit parallel data) are sequentially written into the buffer 134 in an order indicated by a cell identification number assigned, as information concerning the adaptation layer, to each ATM cell. The fluctuation timer 132 measures the aforementioned fluctuation compensation time (Amx−t). The overflow/vacant detection circuit 133 determines whether or not the buffer 134 has overflown or whether or not the buffer 134 has an available storage area. The cell flag counter 135 counts the number of cells which has been input until the EOM cell is received. The read address counter 136 generates a read address of the buffer 134. The read sequence control circuit 137 executes a control process in which parallel data read from the buffer 134 is converted into serial data forming a frame.

The fluctuation compensation time (Amx−t) determined in the aforementioned manner is set in the fluctuation timer 132 shown in FIG. 11. When it is determined, based on the information concerning the adaptation layer, that a cell received from the transmission side is a BOM cell, the fluctuation timer 132 is activated. The cell is written into a position in the buffer 134 specified by the write address counter 130. At the same time as the above, the cell flag counter 135 is activated, and the number of cells written into the buffer 134 is counted. When the time measured by the fluctuation timer 132 has reached a predetermined time, the fluctuation timer 132 activates the cell flag counter 135. When the cell flag counter 135 is activated, the data indicating the number of cells which has been received is supplied to the read sequence control circuit 137. The read sequence control circuit 137 already sends the flag before the cells are disassembled. Hence, the read sequence control circuit 137 stops sending the flag in response to receipt of the data from the cell flag counter 135. Data is read from the buffer 134 in accordance with the address generated by the read address counter 136. When the number of cells specified by the cell flag counter 135 has been read from the buffer 134, the read sequence control circuit 137 adds the flag to the last cell, so that the assembling of an HDLC frame is completed.

A description will now be given of the details of the structure shown in FIG. 11.

Figure 12A:
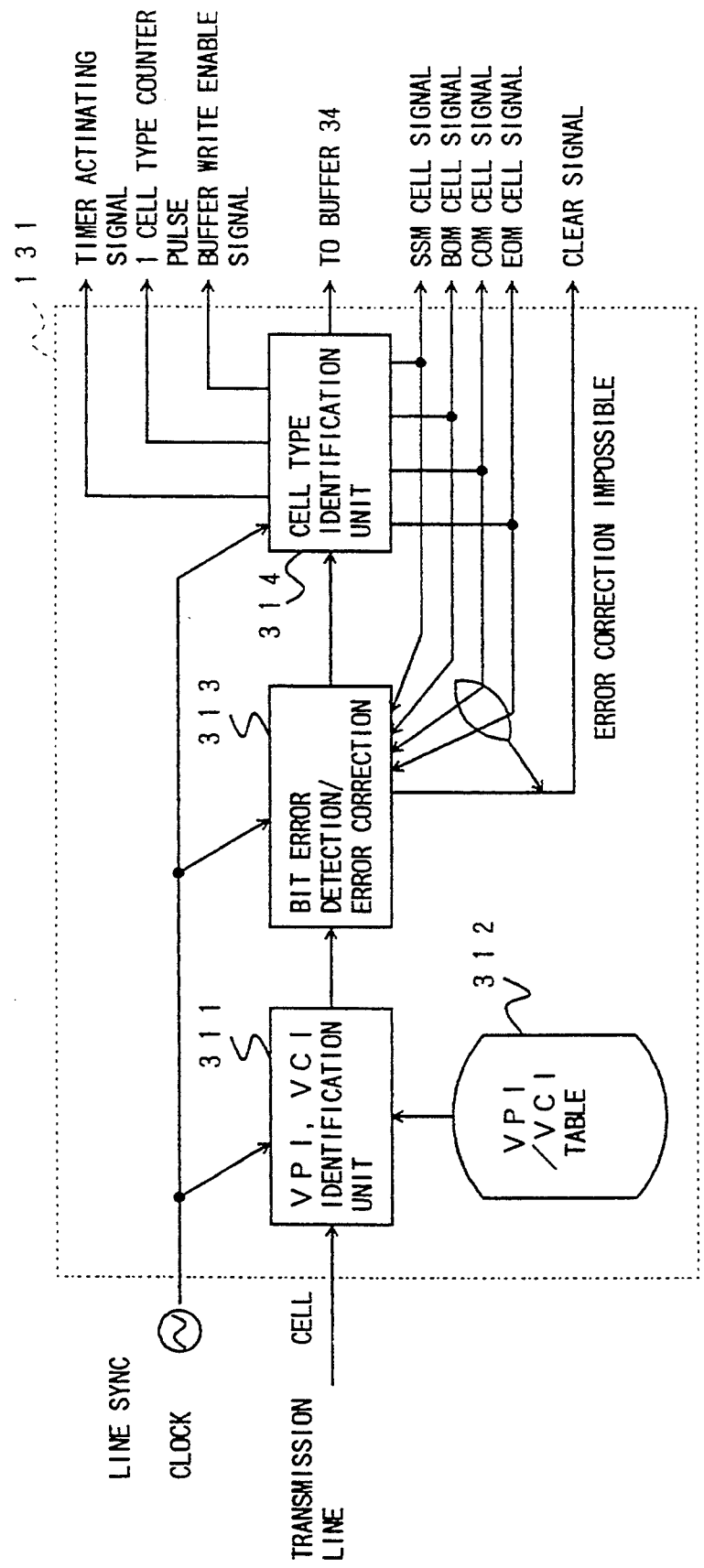
FIG. 12A is a block diagram of a write sequence control circuit shown in FIG. 11.

FIG. 12A is a block diagram of the write sequence control circuit 131. As shown in FIG. 12A, the write sequence control circuit 131 comprises a VPI/VCI identification unit 311, a VPI/VCI table memory 312, a bit error detection/correction unit 313, and a cell type identification unit 310. A transmission line 10 synchronizing clock is applied to the units 311, 313 and 314. The VPI/VCI identification unit 311 determines whether or not a cell received via the transmission line is addressed to the communications node in which the write sequence control circuit 131 being considered is provided. In the above determination process, a VPI (Virtual Path Identifier) value and a VCI (Virtual Channel Identifier) value included in the received cell are compared with the VPI values and VCI values stored in the VPI/VCI table memory 312. When the VPI value and the VCI value respectively identical to the VPI value and VCI value included in the received cell are found in the VPI/VCI table memory 312, the ATM cell other than the ATM header is sent to the bit error detection/correction unit 313. When the VPI value and the VCI value respectively identical to the VPI value and VCI value included in the received cell are not found in the VPI/VCI table memory 312, the ATM cell is discarded.

Figure 12B:
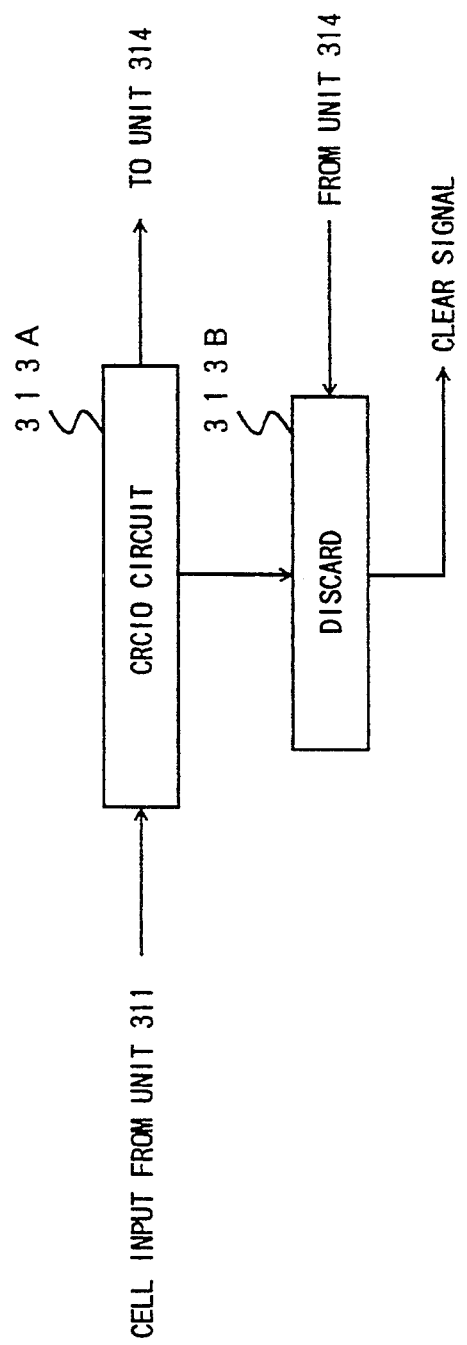
FIG. 12B is a block diagram of a bit error detection/correction unit shown in FIG. 12A.

The bit error detection/correction unit 313 executes an error detection and correction operation by using a CRC code in the adaptation trailer. FIG. 12B shows the details of the bit error detection/correction unit 313. As shown in FIG. 12B, the unit 313 comprises CRC10 circuit 313A and a cell discarding unit 313B. The CRC10 circuit 313A receives the ATM cell other than the ATM header and executes an operation defined by the following expression:

$CRC10: G(x) = X^{10} + X^9 + X^5 X^4 + X + 1$.

The CRC10 CIRCUIT 313A is made up of resistors and exclusive-OR gates in a conventional manner. When it is determined that there is no bit error, the ATM cell is applied to the cell type identification unit 314. When it is determined that there is a bit error, the CRC10 circuit 313A notifies the cell discarding unit 313B that the ATM cell has an error which cannot be corrected. The cell discarding unit 313B is supplied, from the cell type identification unit 310, with a cell type signal indicating the cell type. When the cell type indicates the SSM cell, the cell discarding unit 313B discards only the cell being considered. When the cell type indicates the BOM cell, the cell discarding unit 313B all cells until an EOM cell is received. In this manner, a frame having an erroneous cell is discarded. When the cell type indicates the COM or EOM cell, the cell discarding unit 313 outputs a buffer clearing signal to the buffer 134.

The cell type decision unit 314 identifies the cell type by referring to the cell type indication in the adaptation header of the ATM cell being considered. The cell type identification unit 314 sets a buffer write enable signal to an enable state, and outputs information in the information field of the ATM cell to the buffer 134. When the cell type indicates the SSM cell, the cell type identification unit 314 inactivates a timer activating signal. The timer activating signal is applied to the fluctuation timer 132, which is hence made inactive. Further, the cell type identification unit 341 generates one cell flag counter pulse supplied to the cell flag counter 135. When the cell type indicates the BOM cell, the cell type identification unit 314 activates the timer activating signal, so that the fluctuation timer 132 starts to operate. The activated state of the fluctuation timer 132 is maintained until an EOM cell is received. In this case, the cell type identification unit 314 outputs one cell flag counter pulse to the cell flag counter 135 each time an ATM cell is received.

Figure 13:
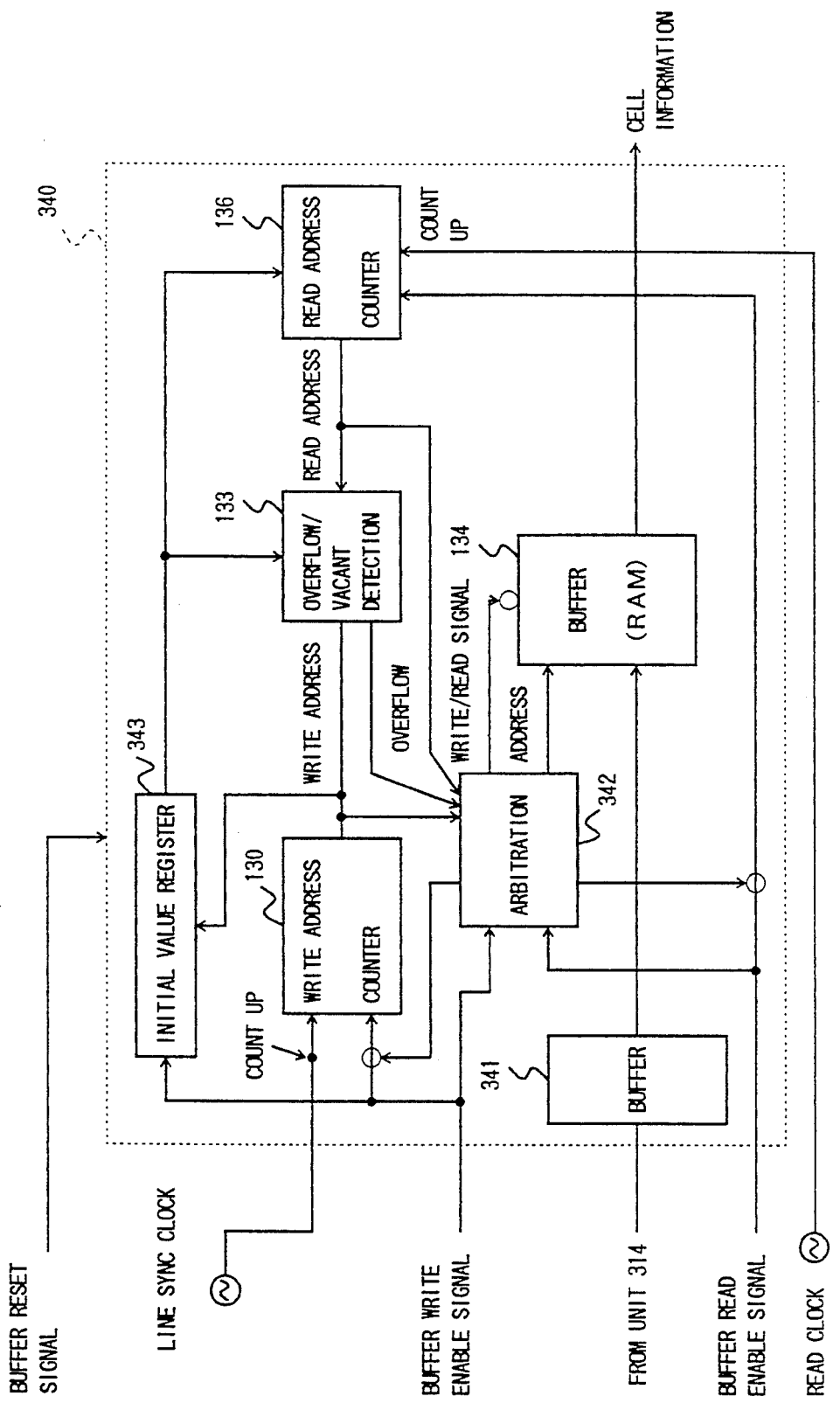
FIG. 13 is a block diagram of a buffer and shown in FIG. 11 and its peripheral circuits.

FIG. 13 shows a block 340 including the buffer 134 shown in FIG. 11 and peripheral circuits thereof. In addition to the structural elements shown in FIG. 11, the block 340 comprises a buffer 341, an arbitration unit 342, and an initial value register 343. The block 340 is reset by the buffer clearing signal from the write sequence control circuit 131 shown in FIG. 12A. The beginning address of the buffer 134 generated by the write address counter 130 is stored in the initial value register 343 when the buffer write enable signal is switched to the enable state. The write address counter 130 is formed of, for example, $2^{13}$ counter when the buffer 134 has a capacity equal to 8k×8bits. The write address counter 130 increments its counter value synchronously with the transmission line synchronizing clock. The read address counter 136 can be formed with the write address counter 130, and has an initial value equal to that of the write address counter 130. The read address counter 136 increments its counter value synchronously with a read clock when a buffer read enable signal generated by the fluctuation timer 132 is ON.

The overflow/vacant detection circuit 133 compares the initial value stored in the initial value register 343 with the write address generated by the write address counter 130 in order to prevent the write address value which is cyclically changed from exceeding the initial address value. If the write address value is about to exceed the initial address value, the overflow/vacant detection circuit 133 outputs an overflow signal to the arbitration unit 342, so that the read address is selected and output to the buffer 134 and corresponding data is read from the buffer 134. In this manner, data overwriting can be prevented. The arbitration unit 342 performs an arbitration process since the write and read operations cannot be concurrently executed. For example, the write operation and the read operation are alternately carried out. If the read clock also functions as a transfer synchronizing clock to terminals, the write operation is interrupted and the read operation is activated in response to receipt of the read clock because the read clock has a frequency lower than that of the write clock. The buffer 341 temporarily stores information in the information field of the received cell because the write operation of the buffer 134 cannot be performed while the read operation is being executed. The buffer 134 can be formed with, for example, a RAM.

Figure 14:
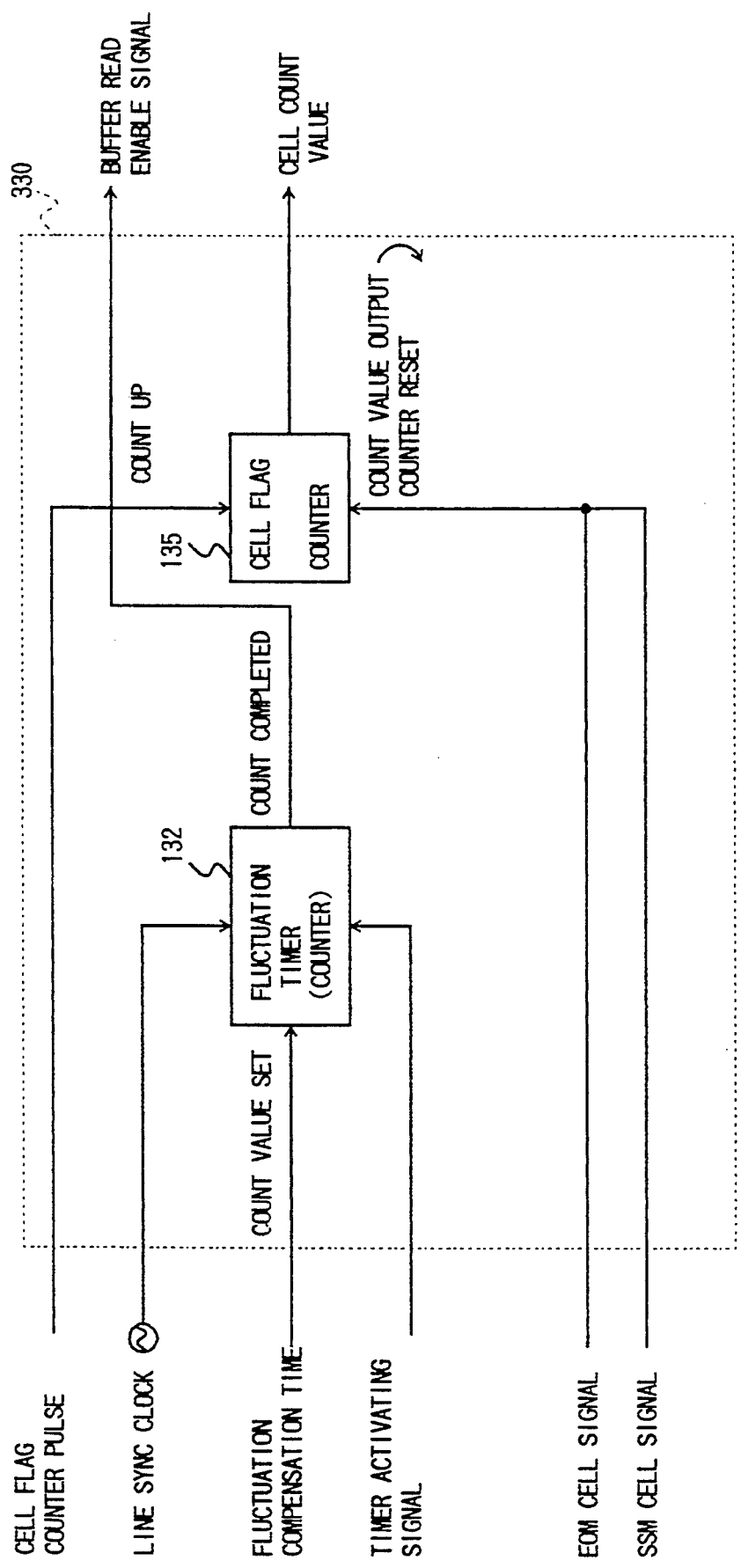
FIG. 14 is a block diagram showing the details of a fluctuation timer and a cell flag counter shown in FIG. 11.

FIG. 14 shows a block 330 including the fluctuation timer 132 and the cell flag counter 135. The fluctuation timer 132 is formed with a counter. The aforementioned fluctuation compensation time (Amx−t) is loaded in the timer 132 when the timer activating signal from the cell type identification unit 314 shown in FIG. 12A is activated. The fluctuation timer 132 increments its counter value in synchronism with the transmission line synchronizing clock. When the counting of the fluctuation compensation time (Amx−t) is completed, the fluctuation timer 132 changes the buffer read enable signal to an enable state. As has been described previously, the buffer read enable signal is applied to the read address counter 136 shown in FIG. 13. When the timer activating signal is made inactive, the fluctuation timer 132 is disabled, and the buffer read enable signal is disabled. The cell flag counter 135 increments its counter value each time the cell flag counter pulse is received. When the SSM cell signal generated by the cell type identification unit 314 shown in FIG. 12A is received, the cell flag counter 135 outputs a counter value of "1", and is then reset. The generation of the SSM cell signal means that the received cell is an SSM cell. In this case, only one cell flag counter pulse is generated, the counter value of the cell flag counter 135 is equal to 1. When the EOM cell signal is received, the cell flag counter 135 supplies the read sequence control circuit 137 with data indicating the number of cells which have been received, and is then reset.

Figure 15A:
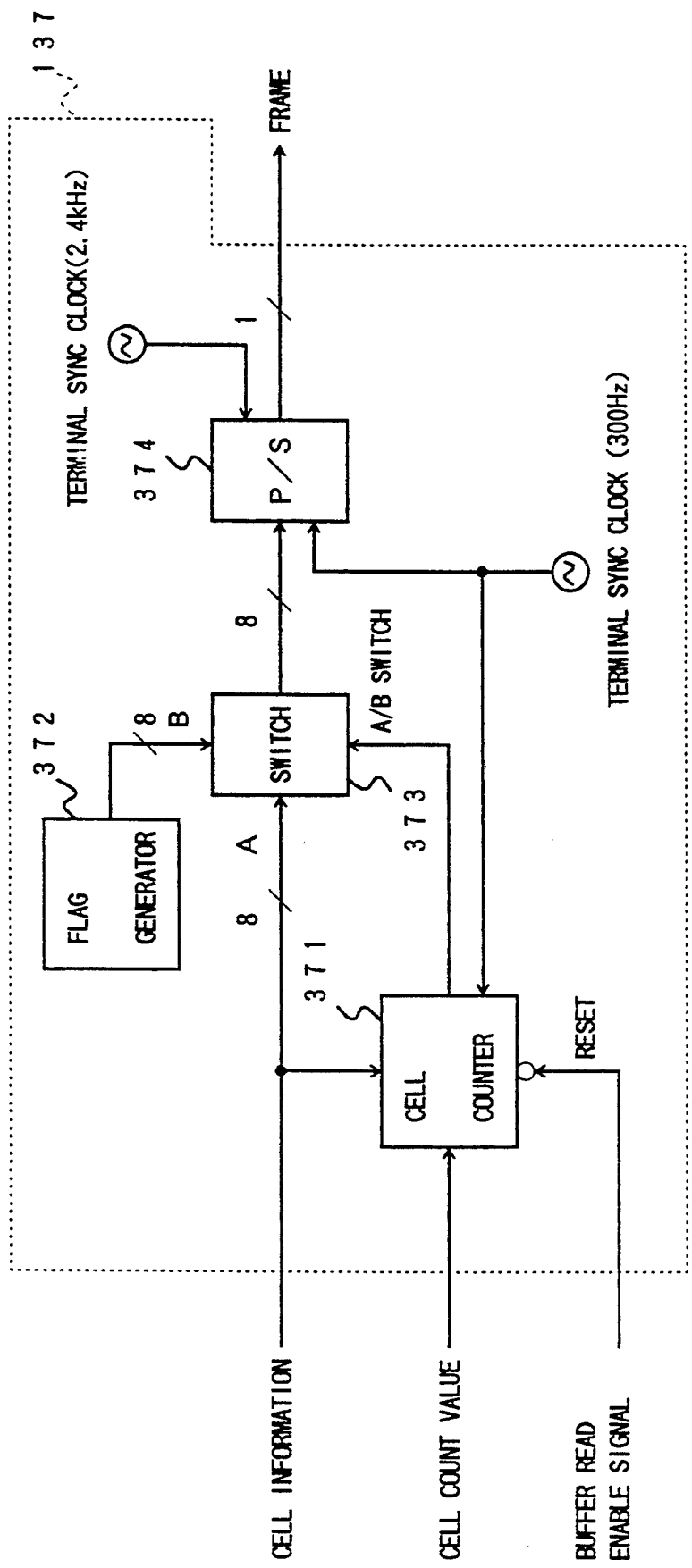
FIG. 15A is a block diagram of a read sequence control circuit shown in FIG. 11.

FIG. 15A shows the details of the read sequence control circuit 137 shown in FIG. 11. The read sequence control circuit 137 comprises a cell counter 371, a flag generator 372, a switch 373, and a parallel-to-serial (P/S) converter 374.

Figure 15B:
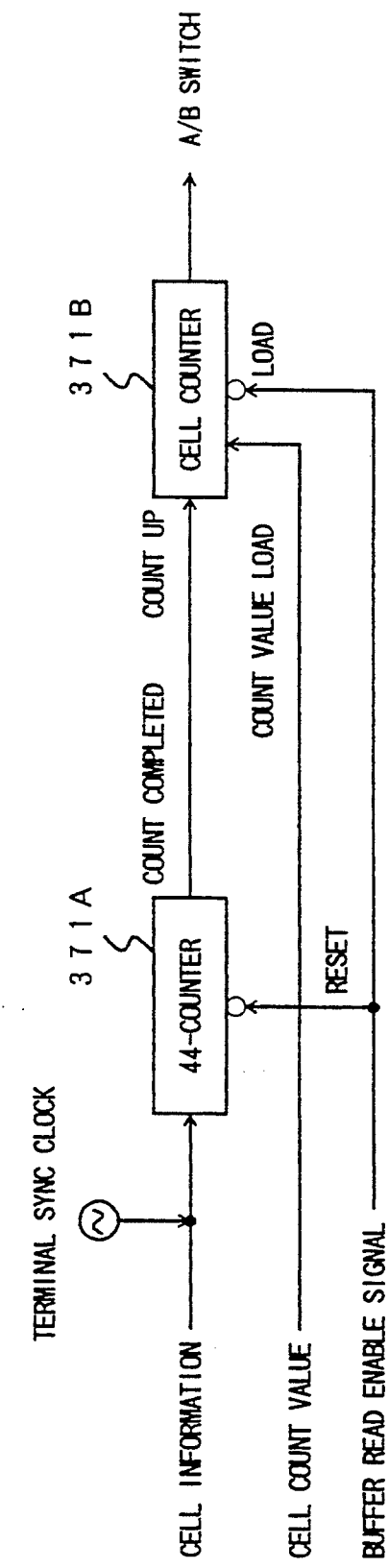
FIG. 15B is a block diagram of a cell counter shown in FIG. 15A.

FIG. 15B shows the cell counter 371 shown in FIG. 15A. As shown in FIG. 15B, the cell counter 371 comprises a 44-counter 371A and a cell counter 371B. The 44-counter 371A is supplied with information in the information field of the received cell synchronously with the terminal synchronizing clock (having a frequency of, for example, 300 Hz). Each time the counter value of the 44-counter 371A becomes equal to one cell length, or 44 bytes, the 44-counter 371A increments the counter value of the cell counter 371B by 1. When the read enable signal is switched to the enable state, the cell count value from the cell flag counter 135 shown in FIG. 14 is loaded in the cell counter 371B. When the cell counter 371B becomes full, it changes the state of a switch control signal so that the switch 373 shown in FIG. 15A selects a terminal B in lieu of a terminal A.

The switching operation of the switch 373 is controlled by the switch control signal generated by the cell counter 371B. When information amounting to one cell length has been received, the switch 373 selects the flag generator 372 in response to receipt of the switch control signal, so that the flag (flag pattern) is output subsequent to the end of the information. The information with the flag being added thereto is supplied to the P/S converter 374 synchronously with the terminal synchronizing signal. Then, serial data converted by the P/S converter 374 is output to the frame transmitting buffer unit 8 shown in FIG. 4 synchronously with the terminal synchronizing clock having a frequency of, for example, 2,4 kHz which is eight times that of the terminal synchronizing clock having a frequency of 300 Hz.

A description will now be given of a procedure for obtaining the fluctuation compensation time (Amx−t) with reference to FIGS. 16 and 17. The procedure described below uses a management cell in order to obtain the fluctuation compensation time.

Figure 16:
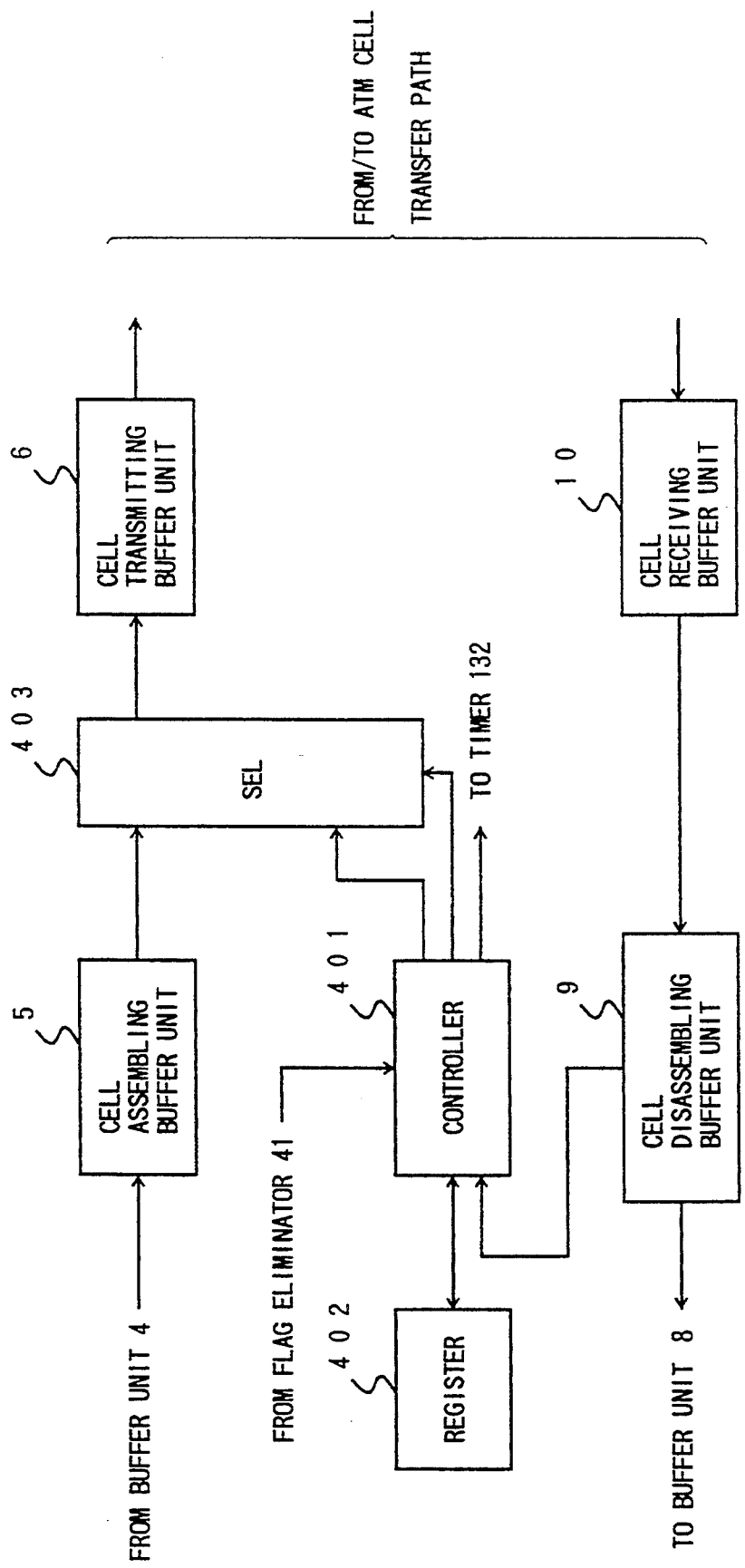
FIG. 16 is a block diagram showing a part of the communications node shown in FIG. 4.

FIG. 16 shows a part of the communications node 1 shown in FIG. 4. In FIG. 16, parts that are the same as parts shown in the previously described figures are given the same reference numerals as previously. A controller 401, a register 402 and a selector 403 are added to the structure shown in FIG. 4. Each of the communications nodes (#1, #2, #3) 21 shown in FIG. 5 has the configuration shown in FIG. 16 in the case where the management cell is used to obtain the fluctuation compensation time. As has been described previously, the control signal lines 27 are not used for obtaining the fluctuation compensation time when the management cell is used.

Figure 17:
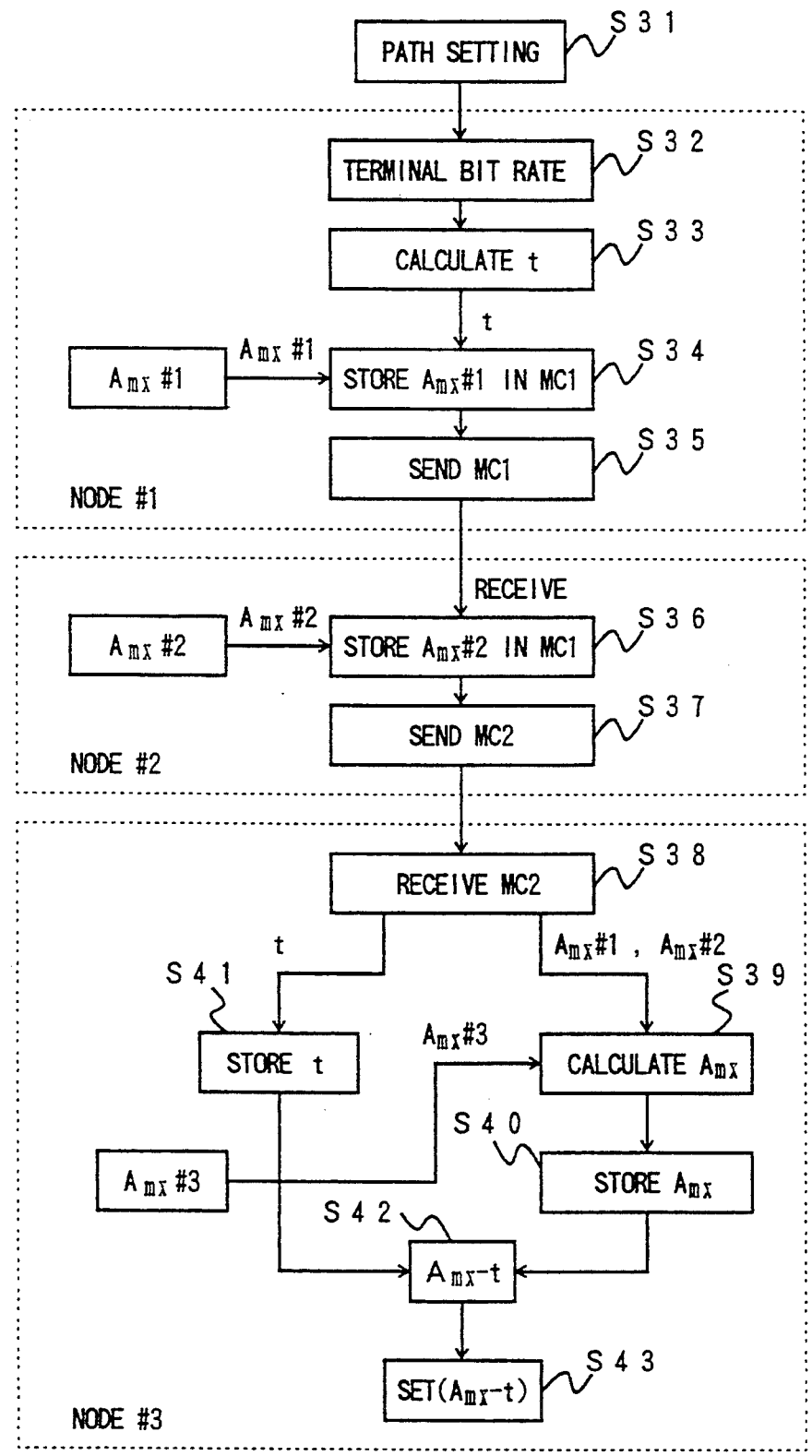
FIG. 17 is a flowchart showing a procedure for obtaining a maximum fluctuation time.

When the terminal 28 shown in FIG. 5 calls the terminal 29, the fluctuation compensation time to be used in the communications node #3 is obtained in a sequence shown in FIG. 17. The sequence shown in FIG. 17 is controlled by the controller 401 in each of the communications nodes #1, #2 and #3 shown in FIG. 5.

When a call (path) setup is requested by the terminal 28 in step S31, the controller 401 of the communications node #1 obtains data indicating the bit rate of the terminal 28 from the HDLC flag F in step S32. Alternatively, the controller 401 reads data indicating the bit rate of the terminal 28 from the register 402 shown in FIG. 16. Then, the controller 401 calculates the cell transmission time t in step S33. When the bit rate of the terminal 28 is equal to 2,400 bps and information in the information field of one cell is equal to 44 bytes, the cell transmission time is:

$$t = (44 \times 8)/2,400 \approx 147 \text{ ms.}$$

A maximum fluctuation time Amx#1 in the communications node #1 depends on the number of FIFO memories provided therein. If the communications node #1 has 100 FIFO memories, the maximum fluctuation time Amx#1 is calculated as follows:

$$\text{Amx}\#1 = (53 \times 8) \times 100 \times (1/384\text{kbps}) \approx 110 \text{ ms}$$

where $(53 \times 8)$ corresponds to the number of bits in one cell, and 384 kbps is the bit rate of the ATM cell transmission line 26 between the communications nodes #1 and #2. The maximum fluctuation time Amx#1 of the communications node #1 is stored in the register 402 thereof beforehand.

In step S34, the controller 401 of the communications node #1 generates a management cell MC1 having a management cell identifier, data indicating the maximum fluctuation time Am#1, and data indicating the cell transmission time t. In step S34, the controller 401 controls the selector 403 and sends the management cell MC1 to the communications node #2 via the ATM cell transmission line 26.

In step S36, the controller 401 of the communications node #2 receives the management cell MC1 via the units 10 and 9 shown in FIG. 16. The register 402 of the communications node #2 stores data 35 indicating a maximum fluctuation time Amx#2 thereof. If 200 FIFO memories are provided in the communications node #2, the maximum fluctuation time Amx#2 of the communications node #2 is obtained as follows:

$$\text{Amx}\#2 = (53 \times 8) \times 200 \times (1/384\text{kbps}) \approx 220 \text{ ms}$$

where 384 kbps is the bit rate of the ATM cell transmission line 26 between the communications nodes #2 and #3. In step S36, the controller 401 of the communications node #2 generates a management cell MC2 by inserting data indicating the maximum fluctuation time Amx#2 into the management cell MC1. In step S37, the controller 401 of the communications node #2 controls the selector 403 and sends it to the communications node #3 via the ATM cell transmission line 26.

In step S38, the controller 401 of the communications node #3 receives the management cell MC2 via the units 10 and 9. In step S41, the controller 401 of the communications node #3 temporarily stores the data indicating the cell transmission time t into the register 402. In step 39, the controller 401 extracts data indicating the maximum fluctuation times Amx#1 and Amx#2 from the management cell MC2, and calculates the maximum fluctuation time of the line passing through the communications nodes #1, #2 and #3 as follows:

$$\text{Amx} = \text{Amx}\#1 + \text{Amx}\#2 + \text{Amx}\#3$$

where Amx#3 is a maximum fluctuation time of the communications node #3. If 100 FIFO memories are provided in the communications node #3, the maximum fluctuation time Amx#3 of the communications node #3 is calculated as follows:

$$\text{Amx}\#3 = (53 \times 8) \times 100 \times (1/384\text{kbps}) \approx 110\text{ms}$$

where 384 kbps indicates the bit rate at which ATM cells are transferred via the FIFO memories.

When the maximum fluctuation times Amx#1, Amx#2 and Amx#3 are respectively equal to 110 ms, 220 ms and 110 ms, the maximum fluctuation time Amx is as follows:

$$\text{Amx} = \text{Amx}\#1 + \text{Amx}\#2 + \text{Amx}\#3$$

$$= 110 + 220 + 110 = 440 \text{ ms.}$$

In step S40, the controller 401 of the communications node #3 temporarily writes data indicating the maximum fluctuation time Amx into the register 402 thereof.

In step S42, the controller 401 of the communications node #3 reads data indicating the cell transmission time t and data indicating the maximum fluctuation time Amx, and calculates the fluctuation compensation time (Amx−t). In the example being considered, the fluctuation compensation time is obtained as follows:

(Amx−t)=440−147=293 ms.

In step S43, the controller 401 of the communications node #3 sends a counter value corresponding to the above fluctuation compensation time (Amx−t) to the fluctuation time 132 shown in FIG. 14. In the communications node #3, disassembly of ATM cells are started after (Amx−t) (=293 ms).

Alternatively, it is possible to calculate the fluctuation compensation times of all lines in each of the communications nodes beforehand.

It will be noted that FIG. 4 shows the configuration of the communications node 1 related to the present invention. In actuality, the communications node 1 include other conventional structural parts.

Figure 18:
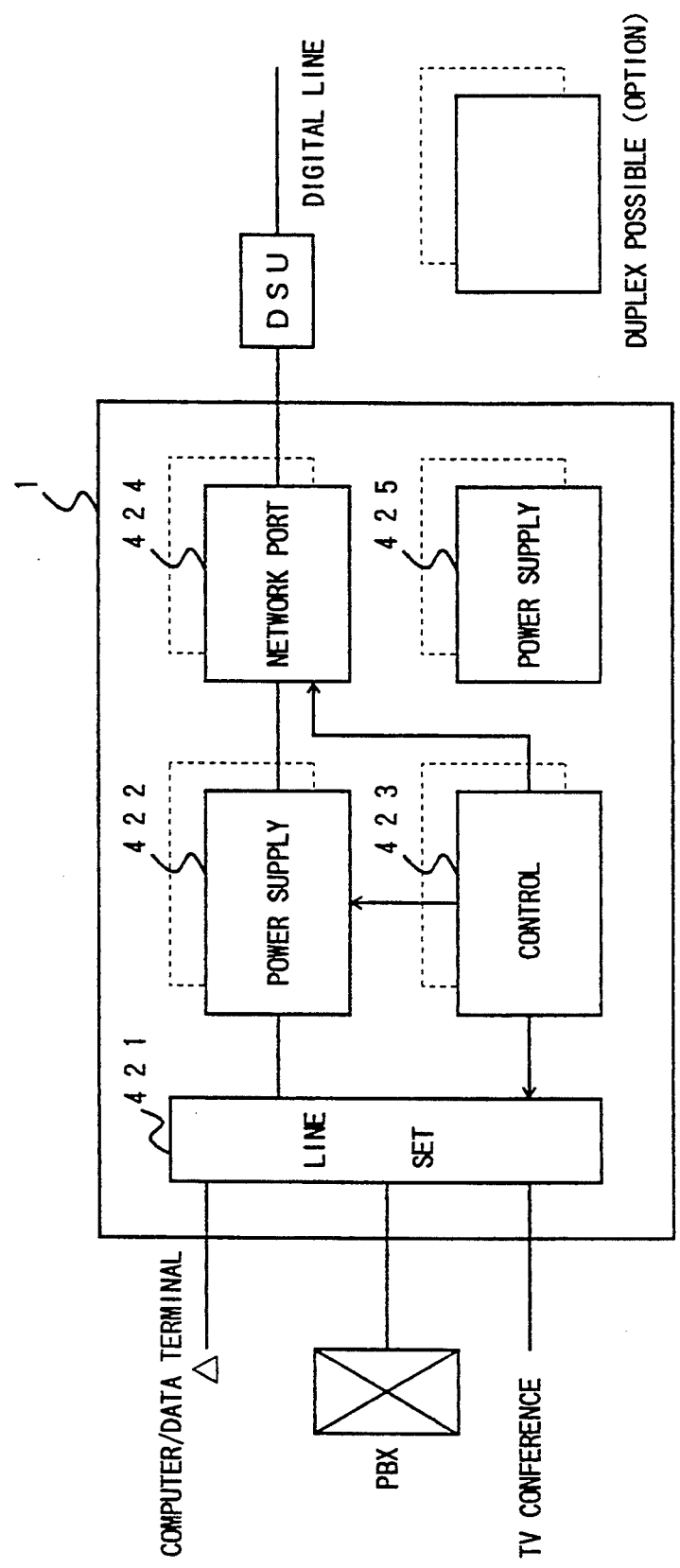
FIG. 18 is a block diagram showing an overview of the entire structure of the communication node shown in FIG. 3.

FIG. 18 shows an overview of the entire configuration of the communications node 1. The communications node 1 comprises an interface unit 421, a main part 422, a control part 423, a network port 424 and a power supply system 425. The interface unit 421 establishes an interface with various types of terminals, such as computers, data terminals, PBXs and video conference terminals. The main part 422 concentrates digital signals from the interface unit 421, and multiplexes them with each other. Normally, the main part 422 has a time division multiplexing system and an ATM multiplexing system. In the time division multiplexing system, the setting of bit rates of the transmission lines connected to the terminals is carried out, and clock signals extracted from a high bit rate digital line (ATM cell transmission line) are sent to the terminals. In the ATM multiplexing system, ATM multiplexing and ATM cross-connect switching are carried out. Further, clock signals extracted from the high bit rate digital line are sent to the terminals. The control part 423 carries out gathering and transferring of management information concerning the communications node 1, a line setup process, and a test process. The network port 424 establishes an interface with the high bit rate digital line via a digital service unit (DSU).

The present invention is not limited to the specifically disclosed embodiments, and variations and modifications may be made without departing from the scope of the present invention.

What is claimed is:

1. A fixed length cell, including a header field with routing information and an information field with data, assembling and disassembling method for a communications network having first and second communications nodes connected by a route and between which data is transferred in successive cells, a first terminal connected to the first communications node by a first transmission line having a bit rate, and a second terminal connected to the second communications node by a second transmission line, said method comprising the steps of:

(a) transferring variable length data, comprising a head and an end and including flag data in the head and the end, from the first terminal to the first communications node via the first transmission line;

(b) starting to assemble, in the first communications node, at least a first cell among a succession of cells from said variable length data when data, contained in said variable length data and equal to one cell, has been received;

(c) successively transferring said first cell and each successive cell from the first communications node to the second communications node; and (d) receiving said first cell and each successive cell by the second communications node;

(e) determining a fluctuation compensation time from a maximum fluctuation time of the route and the bit rate;

(f) starting to disassemble, in the second communications node, said first cell and each successive cell to thereby generate original variable length data when the fluctuation compensation time has elapsed after the first cell is received by the second communications node; and (g) transferring said variable length data to the second terminal from the second communications node via the second transmission line.

2. A fixed length cell, including a header field with routing information and an information field with data, assembling and dissembling method as claimed in claim 1, wherein said step (e) further comprises a step (e-1) of subtracting a one-cell-transmission time, necessary for transferring data equal to one cell via the first transmission line, from the maximum fluctuation time and thereby defining said fluctuation compensation time.

3. A fixed length cell, including a header field with routing information and information field with data, assembling and disassembling method as claimed in claim 1, wherein said step (b) comprises step (b-1) of measuring a time equal to one cell after a beginning flag of the variable length data is received.

4. A fixed length cell, including a header field with routing information and an information field with data, assembling and disassembling method as claimed in claim 1, wherein said step (f) further comprises the steps of:

(f-1) determining whether said first cell includes all data contained, as transmission data, in said variable length data; and (f-2) immediately starting to disassemble, in the second communication node, said first cell to thereby generate original variable length data without a delay corresponding to said fluctuation compensation time when it is determined by said step (f-1) that said one cell includes all data contained in said variable length data.

5. A fixed length cell, including a header field with routing information and an information field with data, assembling and disassembling method as claimed in claim 1, wherein said step (b) further comprises a step (b-1) of counting 44 bytes in synchrony with a predetermined pulse signal after a beginning flag of the variable length data is received.

6. A fixed length cell, including a header field with routing information and an information field with data, assembling and disassembling system comprising:

a network over which data is transferred as a succession of cells;

a first terminal transferring variable length data, comprising a head and an end and including flag data in the head and the end;

a first transmission line having a bit rate and coupled to said first terminal;

a second terminal receiving variable length data comprising a head and an end and including flag data in the head and the end;

a second transmission line coupled to said second terminal;

a first communications node coupled to said first terminal by the first transmission line and to said network, said first communications node comprising:

first means for assembling at least a first cell among a succession of cells from the variable length data transferred from the first terminal via the first transmission line, said first means starting to assemble said first cell when data which is contained in said variable length data and equal to one cell has been received by said first communications node; and second means for successively transferring said first cell and each successive cell from the first communications node to said network; and a second communications node coupled to said second terminal by the second transmission line and to said network forming a route between the first communications node and the second communications node, said second communications node comprising:

third means for determine a fluctuation compensation time based on the route and the bit rate;

fourth means for disassembling said first cell and each successive cell to thereby generate variable length data, said fourth means starting to disassemble said first cell and each successive cell when the fluctuation compensation time has elapsed after the first cell is received by the fourth means; and fifth means for transferring said variable length data to the second terminal from the second communications node via the second transmission line.

7. A fixed length cell, including a header field with routing information and an information field with data, assembling and disassembling system as claimed in claim 6, wherein said third means further comprises sixth means for subtracting a one-cell-transmission time necessary for transferring data equal to one cell via the first transmission line from the maximum fluctuation time and outputting a subtraction result corresponding to said fluctuation compensation time.

8. A fixed length cell, including a header field with routing information and an information field with data, assembling and disassembling system as claimed in claim 6, wherein said third means further comprises seventh means for measuring a time equal to transmission time of one cell following receipt of a beginning flag of the variable length data.

9. A fixed length cell, including a header field with routing information and an information field with data, assembling and disassembling system as claimed in claim 6, wherein the fourth means further comprises:

eighth means for determining whether said first cell includes all data contained, as transmission data, in said variable length data; and ninth means for making said fourth means immediately start to disassemble said at least one cell to thereby generate original variable length data without a delay corresponding to said fluctuation compensation time when said eighth means determines that said one cell includes all data contained in said variable length data.

10. A fixed length cell, including a header field with routing information and an information field with data, assembling and disassembling system as claimed in claim 6, wherein said second means comprises tenth means for counting 44 bytes synchronously with a predetermined pulse signal after a beginning flag of the variable length data is received.

11. A communications node in a fixed length cell, including a header field with routing information and an information field with data, assembling and disassembling system, said communications node coupled, by a transmission line having a bit rate, to a terminal which transfers variable length data, comprising a head and an end and including flag data in the head and in the end, to and from said communications node and to a network which defines a route there through to another communications node, and sending fixed length transmit cells, each fixed length transmit cell including a header field with routing information and an information field with data, to said another communications node and receiving fixed length receive cells, each fixed length receive cell including a header field with routing information and an information field with data, from said another communications node, said communications node comprising:

first means for assembling a succession of fixed length transmit cells including at least a first fixed length transmit cell from the variable length data transferred from the terminal via the transmission line, said first means starting to assemble said first fixed length transmit cell and each successive fixed length transmit cell when data, which is contained in said variable length data and is equal to one cell, has been received from the terminal;

second means for successively transferring said first fixed length transmit cell and each successive fixed length transmit cell for said communications node to said network;

third means for determining a fluctuation compensation time, based on the route and the bit rate, before receiving a succession of fixed length receive cells including a first fixed length receive cell from the another node;

fourth means for assembling said first fixed length receive cell and each successive fixed length receive cell to thereby generate variable length data, said fourth means starting to disassemble said first fixed length receive cell and each successive fixed length receive cell when the fluctuation compensation time has elapsed after the first fixed length receive cell is received by the fourth means; and fifth means for transferring said variable length data to the terminal from the communications node via the transmission line.

12. A communications node as claimed in claim 11, wherein said third means further comprises sixth means for subtracting a one-cell-transmission time necessary for transferring data equal to one cell via the transmission line from a maximum fluctuation time and four outputting a subtraction result corresponding to said fluctuation compensation time.

13. A communications node as claimed in claim 11, wherein said third means further comprises seventh means for measuring a time equal to one cell transmission after a beginning flag of the variable length data is received.

14. A communications node as claimed in claim 11, wherein the fourth means further comprises:

eight means for determining whether said first fixed length receive cell includes all data contained, as transmission data, in said variable length data; and ninth means for making said fourth means immediately start to disassemble said first fixed length receive cell to thereby generate original variable length data without a delay corresponding to said fluctuation compensation time when said ninth means determines that said first fixed length receive cell includes all data contained in said variable length data.

15. A communications node as claimed in claim 11, wherein said second means comprises tenth means for counting 44 bytes synchronously with a predetermined pulse signal following receipt of a beginning flag of the variable length data.

16. An ATM cell assembling and disassembling method for a communications network having first and second communications nodes connected by a route and between which data is transferred in successive cells, a first terminal connected to the first communications node by a first transmission line having a bit rate, and a second terminal connected to the second communications node by a second transmission line, said method comprising the steps of:
 (a) transferring HDLC data conforming to an HDLC format from the first terminal to the first communications node via the first transmission line;
 (b) starting to assemble, in the first communications node, at least a first cell among a succession of cells from said HDLC data when data, contained in said HDLC data and equal to one cell, has been received;
 (c) successively transferring said first cell and each successive cell from the first communications node to the second communications node; and
 (d) receiving said first cell and each successive cell by the second communications node;
 (e) determining a fluctuation compensation time from a maximum fluctuation time of the route and the bit rate;
 (f) starting to disassemble, in the second communications node, said first cell and each successive cell to thereby generate original HDLC data when the fluctuation compensation time has elapsed after the first cell is received by the second communications node; and
 (g) transferring said HDLC data to the second terminal from the second communications node via the second transmission line.

17. An ATM cell assembling and disassembling method as claimed in claim 16, wherein said step (e) further comprises a step (e-1) of subtracting a one-cell-transmission time, necessary for transferring data equal to one cell via the first transmission line, from the maximum fluctuation time and thereby defining said fluctuation compensation time.

18. An ATM cell assembling and disassembling method as claimed in claim 16, wherein said step (b) comprises step (b-1) of measuring a time equal to one cell after a beginning flag of the HDLC data is received.

19. An ATM cell assembling and disassembling method as claimed in claim 16, wherein said step (f) further comprises the steps of:
 (f-1) determining whether said first cell includes all data contained, as transmission data, in said HDLC data; and
 (f-2) immediately starting to disassemble, in the second communication node, said first cell to thereby generate original HDLC data without a delay corresponding to said fluctuation compensation time when it is determined by said step (f-1) that said one cell includes all data contained in said HDLC data.

20. An ATM cell assembling and disassembling method as claimed in claim 16, wherein said step (b) further comprises a step (b-1) of counting 44 bytes in synchrony with a predetermined pule signal after a beginning flag of the HDLC data is received.

21. An ATM cell assembling and disassembling system comprising:
 a network over which data is transferred as a succession of cells;
 a first terminal transferring HDLC data conforming to an HDLC format;
 a first transmission line having a bit rate and coupled to said first terminal
 a second terminal receiving HDLC data conforming to an HDLC format;
 a second transmission line coupled to said second terminal;
 a first communications node coupled to said first terminal by the first transmission line and to said network, said first communications node comprising:
  first means for assembling at least a first cell among a succession of cells from the HDLC data transferred form the first terminal via the first transmission line, said first means starting to assemble said first cell when data which is contained in said HDLC data and equal to one cell has been received by said first communications node; and
  second means for successively transferring said first cell and each successive cell from the first communications node to said network; and
 a second communications node coupled to said second terminal by the second transmission line and to said network forming a route between the first communications node and the second communications node, said second communications node comprising:
  third means for determining a fluctuation compensation time based on the route and the bit rate;
  fourth means for disassembling said first cell and each successive cell to thereby generate HDLC data, said fourth means starting to disassemble said first cell and each successive cell when the fluctuation compensation time has elapsed after the first cell is received by the fourth means; and
  firth means for transferring said HDLC data to the second terminal from the second communications node via the second transmission line.

22. An ATM cell assembling and disassembling system as claimed in claim 21, wherein said third means further comprises sixth means for subtracting a one-cell-transmission time necessary for transferring data equal to one cell via the first transmission line for the maximum fluctuation time and outputting a subtraction result corresponding to said fluctuation compensation time.

23. An ATM cell assembling and disassembling system as claimed in claim 21, wherein said third means further comprises seventh means for measuring a time equal to transmission time of one cell following receipt of a beginning flag of the HDLC data.

24. An ATM cell assembling and disassembling system as claimed in claim 21, wherein the fourth means further comprises:
  eight means for determining whether said first cell includes all data contained, as transmission data, in said HDLC data; and
  ninth means for making said fourth means immediately start to disassemble said at least one cell to thereby generate original HDLC data without a delay corresponding to said fluctuation compensation time when said eighth means determines that said one cell includes all data contained in said HDLC data.

25. An ATM cell assembling and disassembling system as claimed in claim 21, wherein said second means comprises tenth means for counting 44 bytes synchronously with a predetermined pulse signal after a beginning flag of the HDLC data is received.

26. A communication node in an ATM cell assembling and disassembling system, said communications node coupled, by a transmission line having a bit rate, to a terminal which transfers HDLC data conforming to an HDLC format to and from said communications node and to a network which defines a route there through to another communications node, and second ATM transmit cells to said another communications node and receiving ATM receive cells from said another communications node, said communications node comprising:
  first means for assembling a succession of ATM transmit cells including at least a first ATM transmit cell from the HDLC data transferred from the terminal via the transmission line, said first means starting to assemble said first ATM transmit cell and each successive ATM transmit cell when data, which is contained in said HDLC data and is equal to one cell, has been received from the terminal;
  second means for successively transferring said first ATM transmit cell and each successive ATM transmit cell from said communications node to said network;
  third means for determining a fluctuation compensation time, based on the route and the bit rate, before receiving a succession of ATM receive cells including a first ATM receive cell from the another node;
  fourth means for disassembling said first ATM receive cell and each successive ATM receive cell to thereby generate HDLC data, said fourth means starting to disassemble said first ATM receive cell and each successive ATM receive cell when the fluctuation compensation time has elapsed after the first ATM receive cell is received by the fourth means; and
  fifth means for transferring said HDLC data to the terminal from the communications node via the transmission line.

27. A communications node as claimed in claim 26, wherein said third means further comprises sixth means for subtracting a one-cell-transmission time necessary for transferring data equal to one cell via the transmission line from a maximum fluctuation time and four outputting a subtraction result corresponding to said fluctuation compensation time.

28. A communications node as claimed in claim 26, wherein said third means further comprises seventh means for measuring a time equal to one cell transmission after a beginning flag of the HDLC data is received.

29. A communications node as claimed in claim 26, wherein the fourth means further comprises:
  eighth means for determining whether said first ATM receive cell includes all data contained, as transmission data, in said HDLC data; and
  ninth means for making said fourth means immediately start to disassemble said first ATM receive cell to thereby generate original HDLC data without a delay corresponding to said fluctuation compensation time when said ninth means determines that said first STM receive cell includes all data contained in said HDLC data.

30. A communications node as claimed in claim 26, wherein said second means comprises tenth means for counting 44 bytes synchronously with a predetermined pulse signal following receipt of a beginning flag of the HDLC data.

* * * * *

UNITED STATES PATENT AND TRADEMARK OFFICE
CERTIFICATE OF CORRECTION

PATENT NO. : 5,375,121
DATED : December 20, 1994
INVENTOR(S) : Tetsuo NISHINO et al.

It is certified that error appears in the above-indentified patent and that said Letters Patent is hereby corrected as shown below:    In the drawing:

Fig. 12A, Sheet 14, change "ACTINATING" to --ACTIVATING--.

Col. 2, line 1, change "octets" to --bytes--;
    line 38, after "is" insert --located--; and
    line 39, delete "located".

Col. 3, line 13, change "are" to --is--.

Col. 7, line 18, change "one-celltransmission" to --one-cell transmission--.

Col. 10, line 52, delete "10".

Col. 11, line 13, after "$x^5$" insert --+--.

Col. 13, line 63, change "$\approx$" to --$\dot{=}$--.

Col. 14, line 3, change "$\approx$" to --$\dot{=}$--;
    line 21, delete "35";
    line 26, change "$\approx$" to --$\dot{=}$--; and
    line 54, change "$\approx$" to --$\dot{=}$--.

Col. 16, line 32, after "and" insert --an--.

Col. 17, line 27, change "determine" to --determining--.

Col. 18, line 16, change "there through" to --therethrough--;
    line 37, change "for" to --from--; and
    line 59, change "four" to --for--.

UNITED STATES PATENT AND TRADEMARK OFFICE
CERTIFICATE OF CORRECTION

PATENT NO. : 5,375,121
DATED : December 20, 1994
INVENTOR(S) : Tetsuo NISHINO et al.

It is certified that error appears in the above-indentified patent and that said Letters Patent is hereby corrected as shown below:

Col. 20, line 10, change "pule" to --pulse--; and
line 31, change "form" to --from--.

Col. 21, line 16, change "counting44" to --counting 44--.

Col. 22, line 19, change "four" to --for--.

Signed and Sealed this

Eighteenth Day of July, 1995

Attest:

BRUCE LEHMAN

*Attesting Officer*         *Commissioner of Patents and Trademarks*